(12) United States Patent
Donderici

(10) Patent No.: US 12,372,651 B2
(45) Date of Patent: Jul. 29, 2025

(54) RETROFIT LIGHT DETECTION AND RANGING (LIDAR)-BASED VEHICLE SYSTEM TO OPERATE WITH VISION-BASED SENSOR DATA

(71) Applicant: GM Cruise Holdings LLC, San Francisco, CA (US)

(72) Inventor: Burkay Donderici, Burlingame, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 333 days.

(21) Appl. No.: 17/830,582

(22) Filed: Jun. 2, 2022

(65) Prior Publication Data

US 2023/0393280 A1 Dec. 7, 2023

(51) Int. Cl.
| | |
|---|---|
| *G01S 17/86* | (2020.01) |
| *B60W 60/00* | (2020.01) |
| *G01S 17/89* | (2020.01) |
| *G01S 17/931* | (2020.01) |
| *G06N 3/08* | (2023.01) |
| *G06V 10/774* | (2022.01) |
| *G06V 10/778* | (2022.01) |
| *G06V 20/56* | (2022.01) |

(52) U.S. Cl.
CPC ........... *G01S 17/86* (2020.01); *B60W 60/001* (2020.02); *G01S 17/89* (2013.01); *G01S 17/931* (2020.01); *G06N 3/08* (2013.01); *G06V 10/774* (2022.01); *G06V 10/778* (2022.01); *G06V 20/56* (2022.01); *B60W 2420/403* (2013.01); *B60W 2420/408* (2024.01); *B60W 2556/45* (2020.02)

(58) Field of Classification Search
CPC ........ G01S 17/86; G01S 17/89; G01S 17/931; B60W 60/001; B60W 2420/403; B60W 2420/408; B60W 2556/45; G06N 3/08; G06V 10/774; G06V 10/778; G06V 20/56
See application file for complete search history.

(56) References Cited

U.S. PATENT DOCUMENTS

| 10,841,483 B1* | 11/2020 | Hunt ......................... G06T 7/13 |
| 11,092,690 B1* | 8/2021 | Meier ..................... G01S 17/89 |
| 11,275,673 B1* | 3/2022 | Dolan .................. G05D 1/0088 |
| 2019/0012808 A1* | 1/2019 | Mou ........................ G08G 1/16 |
| 2019/0120948 A1* | 4/2019 | Yang ..................... G01S 7/4817 |
| 2019/0176841 A1* | 6/2019 | Englard ................ G01S 7/4026 |

(Continued)

*Primary Examiner* — Dale W Hilgendorf
(74) *Attorney, Agent, or Firm* — CANTOR COLBURN LLP

(57) ABSTRACT

Systems and methods for retrofitting a light detection and ranging (LIDAR)-based vehicle computing system to operate with vision-based sensor data are provided. For example, a method implemented by a vehicle may include receiving, from one or more sensors of a first sensing modality at the vehicle, first sensor data associated with a surrounding environment of the vehicle; and retrofitting a vehicle controller of the vehicle that is based on a second sensing modality different from the first sensing modality to operate on the first sensor data, where the retrofitting includes generating second sensor data from the first sensor data based on the second sensing modality; and determining, by the vehicle controller, an action for the vehicle based at least in part on the generated second sensor data.

11 Claims, 11 Drawing Sheets

(56) References Cited

U.S. PATENT DOCUMENTS

| | | | |
|---|---|---|---|
| 2019/0178988 A1* | 6/2019 | Englard | G01S 7/40 |
| 2019/0179024 A1* | 6/2019 | Englard | G06F 18/217 |
| 2019/0179317 A1* | 6/2019 | Englard | G06N 3/045 |
| 2019/0180502 A1* | 6/2019 | Englard | G01S 7/417 |
| 2019/0271767 A1* | 9/2019 | Keilaf | G01S 17/931 |
| 2020/0284883 A1* | 9/2020 | Ferreira | G01S 7/4815 |
| 2020/0301799 A1* | 9/2020 | Manivasagam | G01S 7/497 |
| 2021/0255330 A1* | 8/2021 | Ewert | G06V 20/56 |
| 2022/0091266 A1* | 3/2022 | Sivakumar | G01S 17/89 |
| 2022/0137218 A1* | 5/2022 | Onal | G01N 21/359 356/4.01 |
| 2022/0221585 A1* | 7/2022 | Miao | G01S 7/4808 |
| 2023/0274462 A1* | 8/2023 | Petrov | G06T 7/90 348/180 |
| 2025/0022143 A1* | 1/2025 | Li | G05D 1/021 |

\* cited by examiner

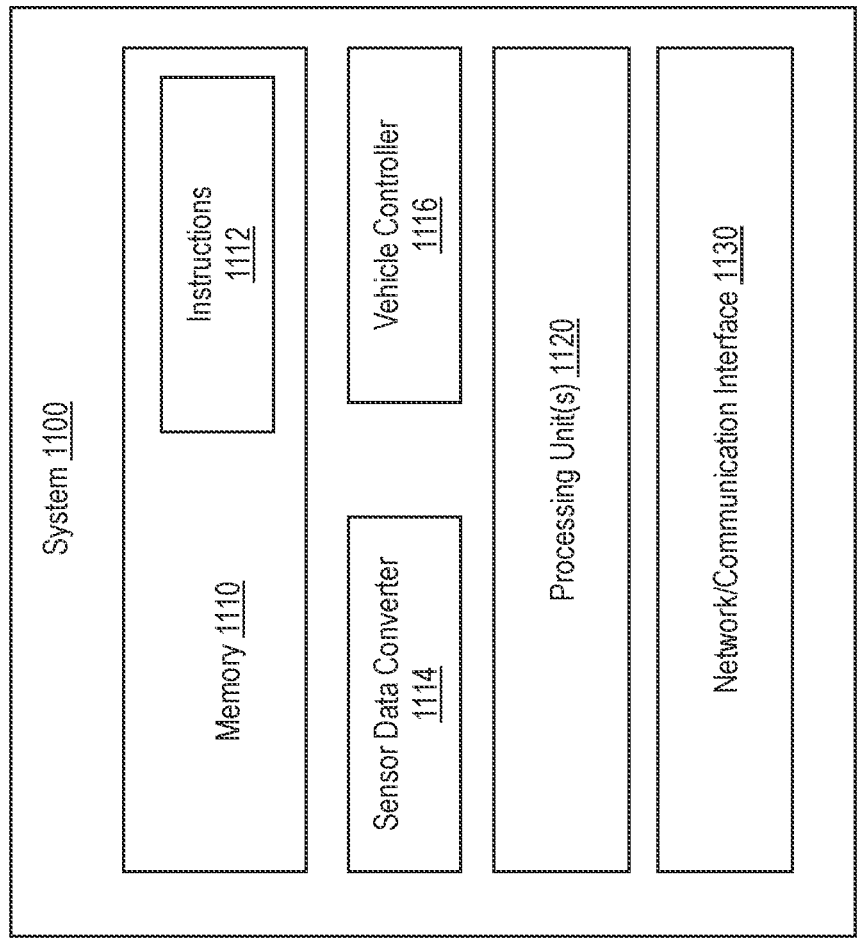

RETROFIT LIGHT DETECTION AND RANGING (LIDAR)-BASED VEHICLE SYSTEM TO OPERATE WITH VISION-BASED SENSOR DATA

TECHNICAL FIELD

The present disclosure relates generally to autonomous vehicles, and more particularly, to retrofitting a light detection and ranging (LIDAR)-based vehicle computing system (e.g., for autonomous driving) to operate with vision-based sensor data.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) to facilitate a vehicle in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 11 illustrates an exemplary computing system used in various embodiments of the present disclosure.

DETAILED DESCRIPTION

Overview

Figure 1:
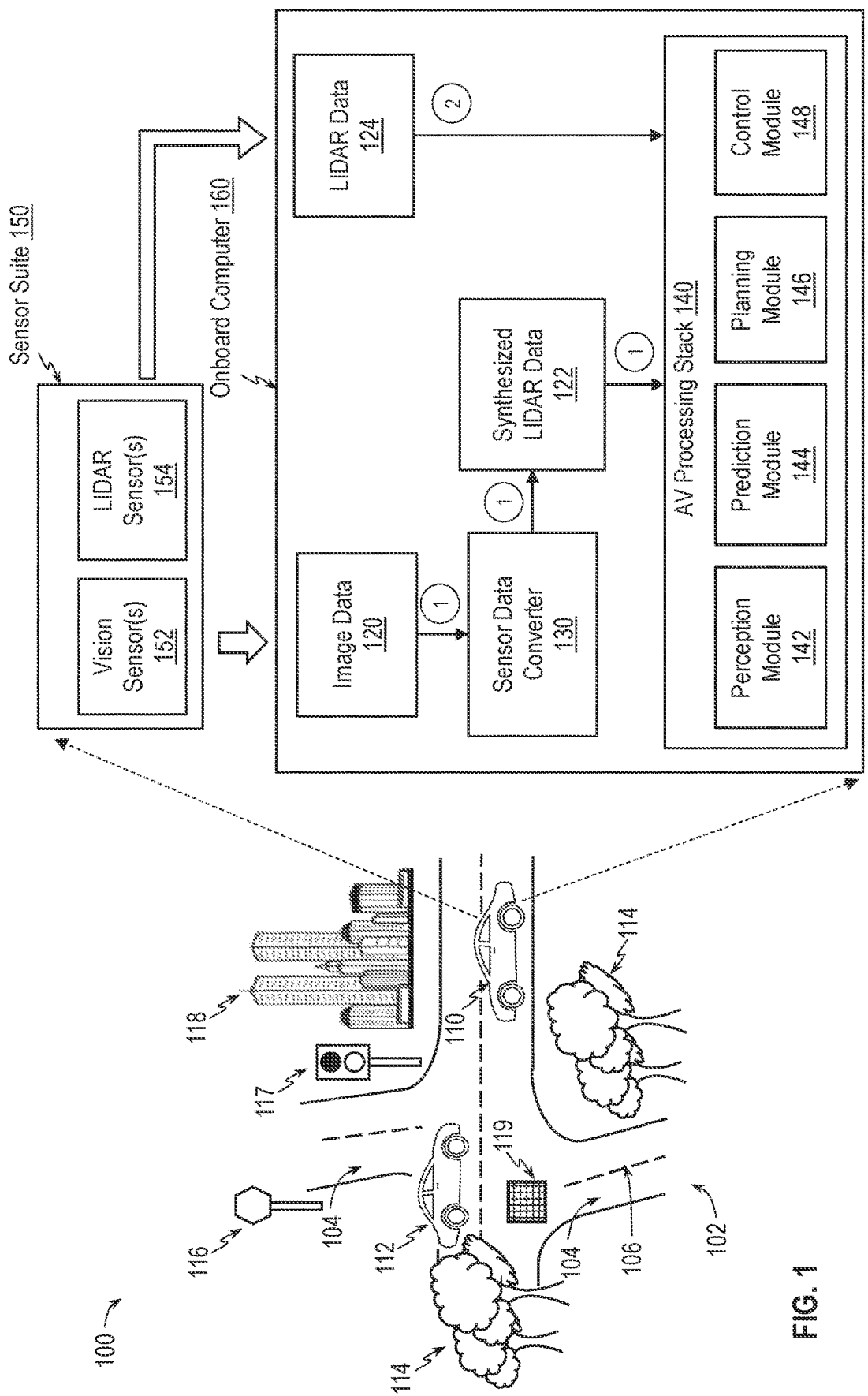
FIG. 1 provides an illustration of an exemplary autonomous driving scenario in which an autonomous vehicle (AV) having a light detection and ranging (LIDAR)-based computing system is retrofitted to make control decisions using vision-based sensor data, according to some embodiments of the present disclosure.

The systems, methods and devices of this disclosure have several innovative aspects, no one of which is solely responsible for the attributes disclosed herein. Details of one or more implementations of the subject matter described in this specification are set forth in the description below and the accompanying drawings.

Autonomous vehicles (AVs) can provide many benefits. For instance, AVs may have the potential to transform urban living by offering opportunity for efficient, accessible and affordable transportation. An AV may be equipped with various sensors to sense an environment surrounding the AV and collect information (e.g., sensor data) to assist the AV in making driving decision. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from point A to point B). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

Some examples of sensors commonly used for autonomous driving may include vision-based sensors and light detection and ranging (LIDAR) sensors. Vision-based sensors, such as video cameras and digital cameras, may detect lights emitted from the surroundings on a photosensitive surface (image plane) through a camera lens (mounted in front of the sensor) to produce images of the surrounding. Vision-based sensors enable AVs to see and interpret objects (e.g., road signs, traffic lights, road lane markings, barriers, etc.) in a road similar to human drivers do with their eyes. Interpretation of objects may leverage machine learning (ML) algorithms to detect the presence of an object, and then leverage ML training to classify or identify what the detected object is. Images captured from a single camera sensor may lack depth information of the detected objects. To provide a sense of depth, stereo cameras in which two camera sensors may be placed spaced apart from each other by a certain separation distance, and images captured by the two camera sensors along with the separation distance may be used to construct depth information for detected objects.

On the other hand, LIDAR sensors emit pulses of infrared beams or laser light which reflect off target objects. These reflections are detected by the LIDAR sensors and the interval taken between emission and receiving of the light pulse enables the estimation of distance to target objects and/or heights, sizes, and/or other attributes of the target objects. LIDAR sensors can be installed on an AV and as the LIDAR sensors scan the surroundings of the AV, a three-dimensional (3D) representation of the AV's surrounding can be mapped out. For instance, a LIDAR sensor may provide a series of data points (acquired from the reflections) representing a 3D scene. The collection of the data points may be referred to as 3D point cloud data. In other instances, some LIDAR sensors may provide one-dimensional (1D) and/or two-dimensional (2D) point cloud data. Depending on the scanning angle of a LIDAR sensor, some LIDAR sensors can be configured to create a full 360-degree map around the AV.

Because of the measurement ranges, the accuracy, and the robustness against surrounding changes (e.g., weather conditions, light conditions, etc.) that LIDAR sensors can provide, some AV computing systems may rely heavily on LIDAR sensors for perception, prediction, planning, and/or control. For instance, perception, prediction, planning, and/or control at an AV may use algorithms and/or ML models that are designed, developed, trained, optimized, and/or tested based on LIDAR data. While an AV may also use other sensors such as vision camera sensors, radio detection and ranging (RADAR) sensors, and/or ultrasonic sensors to sense a surrounding environment, sensor data from these sensors may mostly be used to supplement and/or correct information extracted from the LIDAR data and not for main operations of perception, prediction, and/or planning. However, the cost of LIDAR sensors can be high compared to camera sensors. As such, it may be desirable to build vehicles with camera sensors and with at least a reduced number of LIDAR sensors or even without any LIDAR sensor in the future to reduce cost. However, LIDAR data are in the form of point clouds, whereas camera sensor data are in the form of images as discussed. Hence, algorithms and/or ML models designed, developed, trained, optimized, and/or tested using LIDAR data may not readily operate with vision camera sensor data. One approach to supporting both LIDAR-based computing and vision-based computing is to include a computing system designed, developed, trained, optimized, and/or tested for operating on LIDAR data and a separate computing system designed, developed, trained, optimized, and/or tested for operating on camera sensor data (e.g., vision-based sensor data). However, building and/or maintaining both a LIDAR-based computing system and a vision-based computing system for a single vehicle can increase the cost for design, manufacture, and/or production, and thus may be undesirable.

Accordingly, the present disclosure provides mechanisms for retrofitting a LIDAR-based vehicle computing system to make control decisions using vision-based sensor data. In one aspect of the present disclosure, a vehicle (e.g., an AV) may receive first sensor data associated with a surrounding environment of the vehicle from one or more sensors of the vehicle. The one or more first sensors may be of a first sensing modality while the vehicle may include a vehicle controller designed, developed, trained, optimized, and/or tested (e.g., for making driving decisions) based on a second sensing modality different from the first sensing modality.

To retrofit the vehicle system (the vehicle controller) dependent on the second sensing modality, the vehicle may generate second sensor data from the first sensor data based on the second sensing modality. That is, the vehicle may dynamically convert the first sensor data from the first sensing modality to the second sensing modality to generate the second sensor data in real-time. The vehicle may utilize the vehicle controller to determine an action (e.g., a driving decision) for the vehicle based at least in part on the generated second sensor data. In other words, the vehicle controller can be configured to process third sensor data of the second sensing modality (e.g., to determine at least one of a perception, a prediction, a plan, and/or a control for the vehicle) and be reused to process the generated second sensor data (converted from the first sensor data of the first sensing modality) to determine an action for the vehicle. In some aspects, the first sensing modality may be vision-based (e.g., using camera sensors), and the second sensing modality may be LIDAR-based (e.g., using LIDAR sensors). Accordingly, the first sensor data may include an image of a scene in the surrounding environment of the vehicle, and the generated second sensor data may be generated LIDAR data including a point cloud representative of at least a portion of the scene.

As used herein, generated sensor data (or synthetic sensor data) may refer to sensor data that is captured using one sensing modality and converted into another sensing modality. As an example, generated LIDAR data (or synthetic LIDAR data) may refer to sensor data captured using a non-LIDAR-based sensor (e.g., a vision-based sensor) and subsequently converted to point clouds as opposed to raw LIDAR data captured using LIDAR sensors in real-time In some aspects, as part of generating the second sensor data, the vehicle may determine, from the image, at least one object in the portion of the scene and generating a first point cloud representative of the at least one determined object. In general, one or more objects detected in the scene may be converted to a point cloud. In some aspects, the vehicle controller for determining the action for the vehicle is configured based on a particular LIDAR sensor, and the generating the point cloud representative of the at least the portion of the scene may be further based on a characteristic of that particular LIDAR sensor. In some aspects, the generating the point cloud representative of the at least the portion of the scene may be further based on a data acquisition temporal characteristic (e.g., a scan frequency, scan resolution, scan field of view) of that particular LIDAR sensor. For instance, the point cloud may reproduce the data acquisition temporal characteristic (e.g., the same scan frequency as that particular LIDAR sensor) or improve the data acquisition temporal characteristic (e.g., a higher scan frequency, resolution or field of view than that particular LIDAR sensor). In some aspects, the generating the point cloud representative of the at least the portion of the scene may be further based on a limitation (e.g., scan range, reflectivity, behavior in weather conditions, etc.) of that particular LIDAR sensor. For instance, the point cloud may be generated to reproduce the limitation of that particular LIDAR sensor (e.g., the same scan range, same reflectivity, same behavior in weather conditions, etc.) or improve the limitation of that particular LIDAR sensor (e.g., a longer range, a higher reflectivity, improved behavior in weather conditions, etc.). In some aspects, the generating the point cloud representative of the at least the portion of the scene may be based on a simulation and/or an emulation of the characteristic of that particular LIDAR sensor. That is, as part of generating the point cloud, simulation/emulation may simulate/emulate the beam characteristic, resolution, range characteristics, the scan frequency/angle, blind spot, and/or the LIDAR head movements of that particular LIDAR sensor (e.g., using heuristic algorithms).

In some aspects, as part of generating the second sensor data, the vehicle may process the first sensor data using a ML model to generate the second sensor data. In some aspects, the ML model can be trained using a generative adversarial network (GAN) model. In some aspects, the ML model may be trained based on one or more criteria associated with a performance of the vehicle. For instance, the ML model may be trained to generate LIDAR data such that the vehicle may perform at about same level as when the vehicle uses LIDAR data captured in real-time.

ML algorithms uses computational methods to learn information directly from data without relying on a predetermined equation as a model. The algorithms may adaptively improve their performance as the number of samples available for learning increases. As used herein, an ML model is a model trained to find patterns or make a prediction from new data or unseen data, where the training is based on a large set of training data. In some examples, an ML model may be a neural network including a plurality of layers, for example, an input layer, followed by one or more hidden layers (e.g., fully-connected layers, convolutional layers, and/or pooling layers) and an output layer. Each layer may include a set of weights and/or biases that can transform inputs received from a previous layer and the resulting outputs can be passed to the next layer. The weights and/or biases in each layer can be trained and adapted, for example, to perform certain predictions. An ML model can have any suitable architecture (e.g., a convolutional neural network, a recurrent neural network, a generative network, a discriminator network, etc.).

In some aspects, the vehicle may receive third sensor data from one or more sensors of the first sensing modality and fourth sensor data from one or more sensors of the second sensing modality. The vehicle may combine the third sensor data of the first sensing modality and the fourth sensor data of the second sensing modality to generate fifth sensor data (e.g., enhanced sensor data more informational or accurate than the fourth sensor data alone). The vehicle may determine an action for the vehicle based on the generated fifth sensor data.

In a further aspect of the present disclosure, a computer-implemented system may include receiving input image (e.g., captured from vision-based sensors) and target LIDAR data associated with a geographical area. The input image data may include images of scenes in the geographical area while the target LIDAR data may include point cloud data representing the scene in the geographical area. The computer-implemented system may train an ML model using the input image data and the target LIDAR data. For example, as part of training, the computer-implemented system may process the input image data using the ML model to generate synthesized LIDAR data and update the ML model based on the synthesized LIDAR data and the target LIDAR data. In some aspects, the ML model may be a GAN model including a generator and a discriminator. In some aspects, the updating the ML model is further based on one or more criteria associated with a driving performance. For instance, as part of training the ML model, the computer-implemented system may perform at least one of perception, prediction, or planning operations associated with driving using a first driving performance and update the ML model further based on a comparison of the first driving performance to a target driving performance.

The systems, schemes, and mechanisms described herein can advantageously enable a vehicle (e.g., AV) to utilize a processing system (e.g., an AV processing stack) designed, developed, trained, optimized, and/or tested for operations with LIDAR sensors to operate with vision-based sensors (e.g., camera sensors, video cameras). The utilization of the same processing system at the vehicle can simplify design, manufacturing, maintenance, and/or production of the vehicle, and thus can reduce cost and time to market in producing the vehicle.

Example Autonomous Driving Scenario in which an AV with a LIDAR-Based System is Retrofitted to Operate on Vision Data FIG. 1 provides an illustration of an exemplary autonomous driving scenario 100 in which an AV having a LIDAR-based computing system is retrofitted to make control decisions using vision-based sensor data, according to some embodiments of the present disclosure. As shown in FIG. 1, the scenario 100 may include an AV 110 driving on a roadway system 102. The roadway system 102 may include roads and lanes 104 and road markings 106. Other vehicles such as a vehicle 112 may also be driving on the roadway system 102. As further shown in FIG. 1, the scenario 100 may include trees 114, a road sign 116, a traffic light 117, buildings 118, and an object 119 (e.g., an obstacle, a road barrier, a traffic cone, etc.) located around the roadway system 102. In general, the scenario 100 may include various roadside objects (e.g., moving objects and/or stationary objects) at various locations.

The AV 110 may be a fully autonomous vehicle or a semi-autonomous vehicle. A fully autonomous vehicle may make driving decisions and drive the vehicle without human inputs. A semi-autonomous vehicle may make at least some driving decisions without human inputs. In some examples, the AV 110 may be a vehicle that switches between a semi-autonomous state and a fully autonomous state and thus, the AV 110 may have attributes of both a semi-autonomous vehicle and a fully autonomous vehicle depending on the state of the vehicle.

The AV 110 may include a sensor suite 150 and an onboard computer 160. The sensor suite 150 may include a wide variety of sensors, which may broadly categorize into a computer vision ("CV") system, localization sensors, and driving sensors. In particular, the sensor suite 150 may include one or more vision sensors 152 (e.g., camera sensors). The one or more vision sensors may capture images of the surrounding environment of the AV 110. For instance, the one or more vision sensors may capture images of at least some of the trees 114, the road sign 116, the traffic light 117, the buildings 118, and the object 119 located around the roadway system 102. In some instances, the sensor suite 150 may include multiple vision sensors to capture different views, e.g., a front-facing camera, a back-facing camera, a wide-angle (surround) camera, and side-facing cameras. In some instances, one or more vision sensors may be implemented using a high-resolution imager with a fixed mounting and field of view. One or more vision sensors may have adjustable field of views and/or adjustable zooms. In some embodiments, the vision sensors may capture images continually or at some intervals during operation of the AV 110. The vision sensors may transmit the captured images to the onboard computer 160 of the AV 110 for further processing, for example, to assist the AV 110 in determining certain action(s) to be carried out by the AV 110.

Additionally or alternatively, the sensor suite 150 may include one or more LIDAR sensors 154. The one or more LIDAR sensors 154 may measure distances to objects in the vicinity of the AV 110 using reflected laser light. The one or more LIDAR sensors 154 may include a scanning LIDAR that provides a point cloud of the region scanned. The one or more LIDAR sensors 154 may have a fixed field of view or a dynamically configurable field of view. The one or more LIDAR sensors 154 may produce a point cloud (e.g., a collection of data points in a 3D space) that describes the shape, contour, and/or various characteristics of one or more object in the surrounding of the AV 110 and a distance of the object away from the AV 110. For instance, the point cloud may include data points representing at least some of the trees 114, the road sign 116, the traffic light 117, the buildings 118, and the object 119 located around the roadway system 102. The one or more LIDAR sensors 154 may transmit the captured point cloud to the onboard computer 160 of the AV 110 for further processing, for example, to assist the AV 110 in determining certain action(s) to be carried out by the AV 110.

Additionally or alternatively, the sensor suite 150 may include one or more RADAR sensors. RADAR sensors may operate in substantially the same way as LIDAR sensors, but instead of the light waves used in LIDAR sensors, RADAR sensors use radio waves (e.g., at frequencies of 24, 74, 77, and 79 gigahertz (GHz)). The time taken by the radio waves to return from the objects or obstacles to the AV 110 is used for calculating the distance, angle, and velocity of the obstacle in the surroundings of the AV 110.

Additionally or alternatively, the sensor suite 150 may include one or more location sensors. The one or more location sensors may collect data that is used to determine a current location of the AV 110. The location sensors may include a global positioning system (GPS) sensor and one or more inertial measurement units (IMUS). The one or more location sensors may further include a processing unit (e.g., a component of the onboard computer 160, or a separate processing unit) that receives signals (e.g., GPS data and IMU data) to determine the current location of the AV 110. The location determined by the one or more location sensors can be used for route and maneuver planning. The location may also be used to determine when to capture images of a certain object. The location sensor may transmit the determined location information to the onboard computer 160 of the AV 110 for further processing, for example, to assist the AV 110 in determining certain action(s) to be carried out by the AV 110.

In general, the sensor suite 150 may include any suitable sensors including but not limited to, photodetectors, one or more cameras, RADAR sensors, sound navigation and ranging (SONAR) sensors, LIDAR sensors, GPS, wheel speed sensors, weather sensors, IMUs, accelerometers, microphones, strain gauges, pressure monitors, barometers, thermometers, altimeters, etc. Further, the sensors may be located in various positions in and around the AV 110.

The onboard computer 160 may include one or more processors, memory, communication interface, for example, similar to the system 1100 of FIG. 11. In an example, the onboard computer 160 may receive sensor data (e.g., including the image data 120, the LIDAR data 124, location sensor data, etc.) from the sensor suite 150 and may store the received sensor data at a memory of the onboard computer 160. As shown in FIG. 1, the onboard computer 160 may implement an AV processing stack 140. The AV processing stack 140 may be implemented using a combination of hardware and/or software components. In certain embodiments, the AV processing stack 140 may be a software stack executed by the one or more processors. As further shown in FIG. 1, the AV processing stack 140 may include a perception module 142, a prediction module 144, a planning module 146, and a control module 148. In alternative configurations, fewer, different and/or additional components may be included in the onboard computer 160. For example, components such as map database(s) for assisting the AV 110 in making driving decisions and other vehicle functions are not shown in FIG. 1. In some instances, the AV processing stack 140 may be implemented by a vehicle controller (e.g., the controller 34 of FIG. 10 and/or the vehicle controller 1116 of FIG. 11). Further, functionality attributed to one component of the onboard computer 160 may be accomplished by a different component included in the onboard computer 160 or a different system from those illustrated.

The perception module 142 may analyze the received sensor data (e.g., camera images, point clouds, location information, etc.) provided by the sensor suite 150 and output an understanding or a perception of the environment surrounding the AV 110. In particular, the perception module 142 may extract information related to navigation and making driving decisions. For instance, the perception module 142 may detect objects such as other cars, pedestrians, trees, bicycles, and objects traveling on or near the roadway systems 102 on which the AV 110 is traveling, and indications surrounding the AV 110 (such as construction signs, traffic cones, traffic lights, stop indicators, and other street signs). In the illustrated example of FIG. 1, the perception module 142 may detect one or more of the vehicle 112, the trees 114, the road sign 116, the traffic light 117, the buildings 118, and/or the objects 119 in the surroundings of the AV 110. In some examples, the perception module 142 may include one or more classifiers trained using ML to identify particular objects. For example, a multi-class classifier may be used to classify each object in the environment of the AV 110 as one of a set of potential objects, e.g., a vehicle, a pedestrian, or a cyclist. As another example, a pedestrian classifier may recognize pedestrians in the environment of the AV 110, a vehicle classifier may recognize vehicles in the environment of the AV 110, etc.

The prediction module 144 may perform predictive analysis on at least some of the recognized objects, e.g., to determine projected pathways of other vehicles, bicycles, and pedestrians. The prediction module 144 may also predict the AV 110's future trajectories, which may enable the AV 110 to make appropriate navigation decisions. In some examples, the prediction module 144 may include one or more prediction models trained using ML to determine future motions and/or trajectories of other traffic agents and/or of the AV 110 itself.

The planning module 146 may plan maneuvers for the AV 110 based on map data, data received from the perception module 142, prediction information received from the prediction module 144, and navigation information, e.g., a route instructed by a fleet management system. In some examples, the planning module 146 may receive map data from a map database (e.g., stored locally at the AV 110 or at a remote server) including data describing roadways such as the roadway system 102 (e.g., locations of roadways, connections between roadways, roadway names, speed limits, traffic flow regulations, toll information, etc.), buildings such as the buildings 118 (e.g., locations of buildings, building geometry, building types), and other objects (e.g., location, geometry, object type). In some instances, the map database may further include data describing other features, such as bike lanes, sidewalks, crosswalks, traffic lights, parking lots, etc. In general, a map database may include data describing any known, relatively fixed features and/or objects in a geographical area. In some examples, the planning module 146 may receive data from the perception module 142 describing at least some of the features described by the map data in the environment of the AV 110. The planning module 146 may compare map data with data from the perception module 142 to confirm the accuracy of the map data and to determine the precise positions of perceived objects on the map.

The planning module 146 may determine a pathway for the AV 110 to follow. When the perception module 142 detects moving objects in the environment of the AV 110, the planning module 146 may determine the pathway for the AV 110 based on predicted behaviors of the objects provided by the prediction module 144 and right-of-way rules that regulate behavior of vehicles, cyclists, pedestrians, or other objects. The pathway may include locations for the AV 110 to maneuver to, and timing and/or speed of the AV 110 in maneuvering to the locations.

The control module 148 may send appropriate commands to instruct movement-related subsystems (e.g., actuators, steering wheel, throttle, brakes, etc.) of the AV 110 to maneuver according to the pathway determined by the planning module 146.

According to aspects of the present disclosure, the AV processing stack 140 may include perception, prediction, planning, and/or control algorithms and/or software designed, developed, trained, optimized, and/or tested using mainly LIDAR data, for example, due to the measurement ranges, the accuracy, and/or the robustness against changes in surrounding (e.g., weather conditions, light conditions, etc.) offered by LIDAR sensors as discussed above. However, because the cost of vision-based sensors is substantially lower than LIDAR sensors, it may be desirable to replace at least some, if not all, of the LIDAR sensors in the AV 110 with vision-based sensors.

To avoid maintaining multiple AV processing stacks, for example, one stack for processing LIDAR data and another stack for processing vision-based sensor data or image data, the onboard computer 160 may further include a sensor data converter 130. The sensor data converter 130 may be implemented using a combination of hardware and/or software components. In certain embodiments, the sensor data converter 130 may be a software component executed by the one or more processors of the onboard computer 160. The sensor data converter 130 may convert vision-based or image data to LIDAR data (e.g., point cloud data). In this way, the same AV processing stack 140 that relies on the LIDAR data can be reused for processing the generated or synthesized LIDAR data output from the conversion.

In the illustrated example of FIG. 1, the arrows marked with circles having a numeral 1 are associated with a processing flow at the onboard computer 160 during a first time period (or in a first environment) and the arrows marked with circles having a numeral 2 are associated with a processing flow at the onboard computer 160 during a second, different time period (or in a second, different environment). As shown during the first time period, the onboard computer 160 may receive image data 120 captured by the vision sensor(s) 152 in real-time. The sensor data converter 130 may convert the image data 120 from the vision sensing modality (e.g., a first sensing modality) to LIDAR sensing modality (e.g., a second sensing modality) and output synthesized LIDAR data 122. To that end, the sensor data converter 130 may generate point clouds (e.g., 1D point clouds, 2D point clouds, and/or 3D point clouds) from the received image data 120 based on the LIDAR sensing modality.

In some aspects, the sensor data converter 130 may generate the point clouds based on certain data acquisition characteristics of a particular LIDAR sensor (or LIDAR sensor type or hardware model) that was used to capture LIDAR data on which the design, development, training, optimization, and/or test the AV processing stack 140 was based. As an example, the image data 120 may include an image of the traffic light 117, and the sensor data converter 130 may generate a point cloud representative of the traffic light 117, where the point cloud may have a beam characteristic, a range characteristic, a scan frequency/angle, blind spot, and/or a LIDAR head movement characteristic of that particular LIDAR sensor. In one aspect, the sensor data converter 130 may generate the synthesized LIDAR data 122 by simulating and/or emulating characteristics of that particular certain LIDAR sensor using heuristic algorithms. In other aspects, the sensor data converter 130 may generate the synthesized LIDAR data 122 using ML (e.g., a GAN model). The synthesized LIDAR data 122 output by the sensor data converter 130 may be provided to the AV processing stack 140. The AV processing stack 140 may determine an action (e.g., a driving decision) to be carried out by the AV 110. The action may be associated with perception, prediction, planning, and/or control operations as discussed above.

As further shown in FIG. 1, during the second time period, the AV 110 (or the onboard computer 160) may receive LIDAR data 124 captured by the LIDAR sensor(s) 154 in real-time. Because the AV processing stack 140 is configured for processing LIDAR data, the AV processing stack 140 may process the lived-captured LIDAR data 124 directly (without conversion). However, in some examples, it may be desirable to combine the real-time captured raw LIDAR data 124 with the synthesized LIDAR data 122 to generate enhanced LIDAR data (e.g., to provide more information or more accurate information about the surroundings of the AV 110). The enhanced LIDAR data may be provided to the AV processing stack 140, which may then determine an action (e.g., a driving/control decision) for the AV 110 using the enhanced LIDAR data. Mechanisms for converting or mapping vision-based sensor data or image data to LIDAR data and/or augmenting or enhancing LIDAR data will be discussed more fully below.

Example Vision Data to LIDAR Data Conversion Implementations

Figure 2:
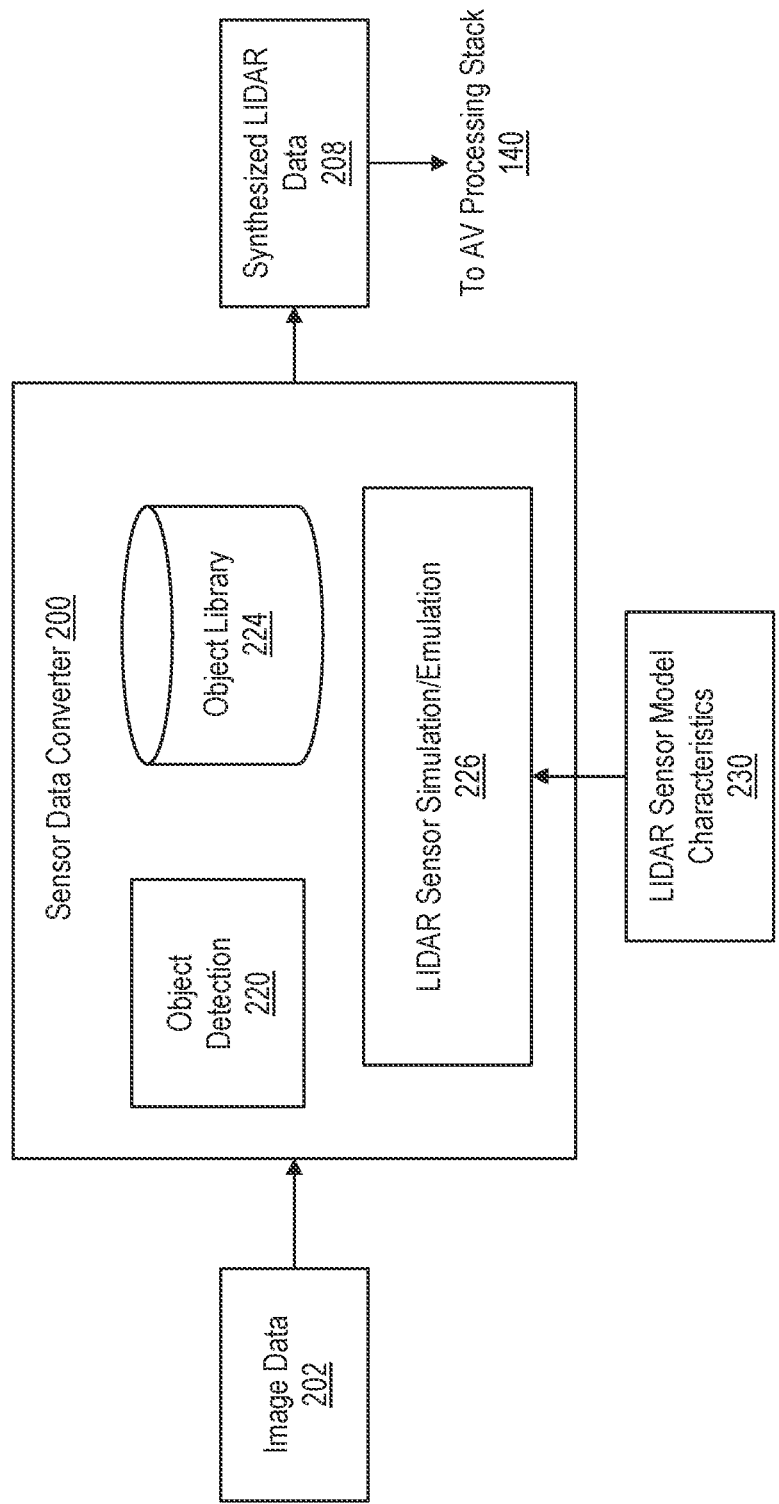
FIG. 2 provides an illustration of an exemplary implementation of a sensor data converter, according to some embodiments of the present disclosure.
Figure 3:
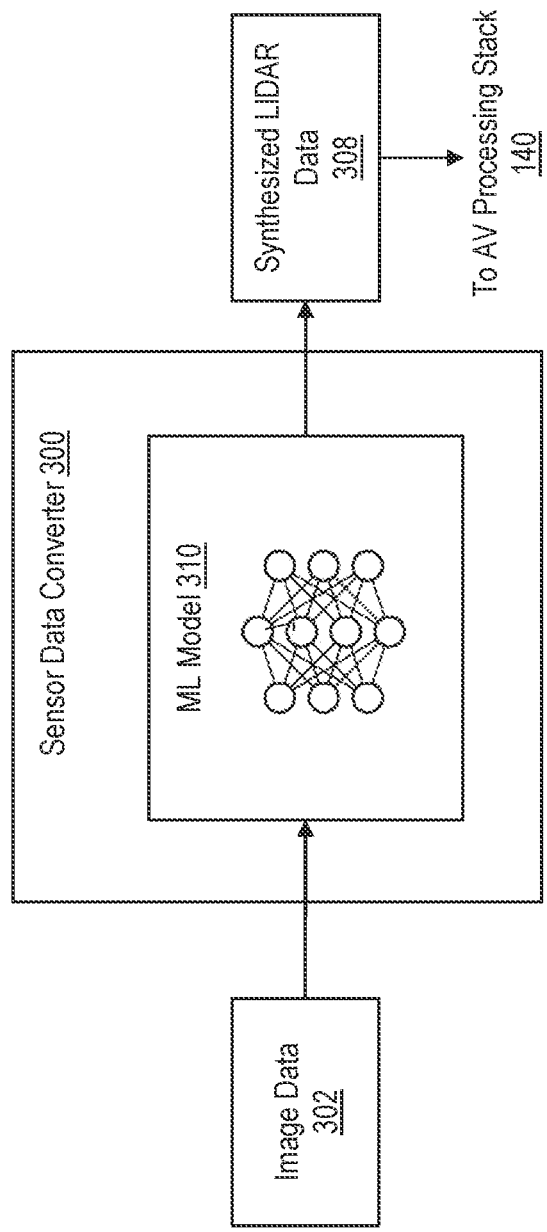
FIG. 3 provides an illustration of an exemplary implementation of a sensor data converter, according to some embodiments of the present disclosure.
Figure 4:
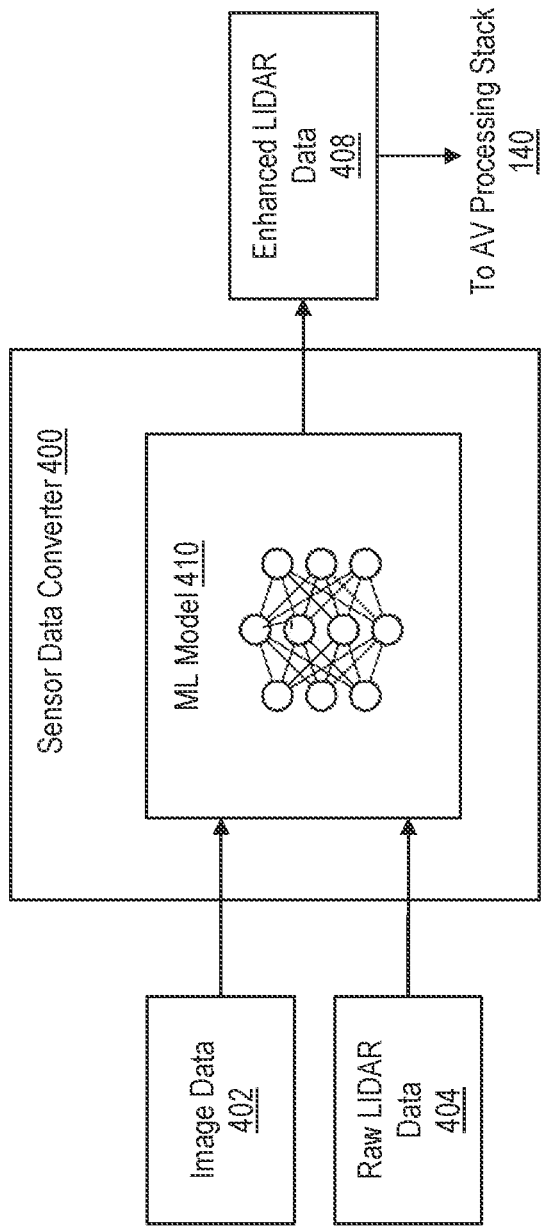
FIG. 4 provides an illustration of an exemplary implementation of a sensor data converter, according to some embodiments of the present disclosure.

FIGS. 2-4 are discussed in relation to FIG. 1 to illustrate various implementations for the sensor data converter 130. FIG. 2 provides an illustration of an exemplary implementation of a sensor data converter 200, according to some embodiments of the present disclosure. In some aspects, the AV 110 of FIG. 1 may implement the sensor data converter 200 in place of the sensor data converter 130 shown in FIG. 1. The sensor data converter 200 can be implemented in software executed by the one or more processors of the onboard computer 160.

At a high level, the sensor data converter 200 may receive image data 202 (e.g., from camera or vision sensor(s) 152 of the AV 110 in real-time). The image data 202 may include an image of a scene in a surrounding environment of the AV 110. As discussed above, the AV 110 may have vision sensors 152 with different facings (e.g., front-facing, side-facing, rear-facing, etc.) and/or with the same facing but with a separation distance, the image data 202 can include images captured by different vision sensors 152. The sensor data converter 200 may detect, from the image data 202, one or more objects (e.g., the trees 114, the road sign 116, the traffic light 117, the buildings 118, the object 119, etc.) in the surrounding environment of the AV 110. The sensor data converter 200 may generate point cloud data representative of the detected one or more objects to provide synthesized LIDAR data 208.

As shown in FIG. 2, the sensor data converter 200 may include an object detection sub-module 220, an object library 224, and a LIDAR sensor simulation/emulation sub-module 226. The object detection sub-module 220 may process the image data 202. The object detection sub-module 220 may implement any suitable object detection algorithms to accurately determine objects (e.g., traffic lights, road signs, road markings, buildings, trees, barriers, etc.) in the AV 110's vicinity. In some examples, the object detection sub-module 220 may implement one or more classifiers to differentiate cars from non-cars, pedestrians from non-pedestrians, or more generally identify particular object(s). In some examples, the object detection sub-module 220 can interact with the perception module 142 in the AV processing stack 140 to detect and identify objects around the AV 110.

The object library 224 may include a collection of point cloud representations of various objects. The object library 224 may store one point cloud for each object or each type of objects, e.g., an image for a road sign, an image for a traffic light, an image for a building, an image for a tree, an image for a crosswalk, etc. In some examples, the object library 224 may store multiple point clouds for one object or one object type, for example, including a 3D representation, a 2D representation, and/or representations of various orientations of the object or object type. In some examples, the point clouds stored at the object library 224 may be captured using certain LIDAR sensors. In other examples, the point clouds stored at the object library 224 may be generated from simulation, for example, based on certain LIDAR sensor parameters such as a scan frequency, a scan angle, a scan range, blind spots, etc. In general, the object library 224 can include point clouds from live-captures or from simulation.

Based on the detection from the object detection sub-module 220, the sensor data converter 200 may select, from the object library 224, a point cloud associated with a detected object. As an example, when the object detection sub-module 220 detected a traffic light (e.g., the traffic light 117) from a scene captured by the image data 202, the sensor data converter 200 may select a point cloud for a traffic light. The sensor data converter 200 may provide the selected point cloud to the LIDAR sensor simulation/emulation sub-module 226.

The LIDAR sensor simulation/emulation sub-module 226 may simulate and/or emulate characteristics of a particular LIDAR sensor device (or LIDAR sensor device model) that was used to capture LIDAR data on which the design, development, training, optimization, and/or test the AV processing stack 140 was based. As shown, the LIDAR sensor simulation/emulation sub-module 226 may receive LIDAR sensor model characteristics 230 for the particular LIDAR sensor hardware and process or modify the selected point cloud (e.g., using heuristic algorithms that are based on interpretation and/or rules) so that the output synthesized LIDAR data 208 may have those characteristics 230 of the particular LIDAR sensor device. The characteristics 230 can include a beam characteristic, a vertical resolution characteristic, a horizontal resolution characteristic, a range characteristic, a scan frequency/angle characteristic, a reflectivity, a blind spot, behaviors under weather conditions (e.g., rain, fog, snow, etc.), LIDAR head movements of the certain LIDAR sensor, and/or any other suitable LIDAR sensor characteristics.

For example, a beam characteristic may include a beam size of a laser beam emitted by the particular LIDAR sensor for the measurement. A vertical resolution characteristic may refer to the angular distance between the scan lines of the LIDAR sensor. A horizontal resolution characteristic may refer to the angular distance between each adjacent lidar point. A range characteristic may refer to farthest distance that the particular LIDAR sensor may detect an object. In some instances, the range can be dependent on the power of the laser source at the particular LIDAR sensor. A scan frequency characteristic may refer to how frequent the particular LIDAR sensor emit a light pulse or acquire measurement data in a scan cycle, and a scan angle characteristic may refer to a field of view or the angle covered by the particular LIDAR sensor (or the angle at which the light signals are emitted). A reflectivity characteristic may refer to an amount or an intensity of light that may be reflected from a certain target surface when using the particular LIDAR sensor. A blind spot characteristic may refer to an area in which the particular LIDAR sensor may failed or missed to detect. A behavior characteristic may include range, measurement accuracy, reflectivity, etc. of the particular LIDAR sensor when sensing under certain weather conditions. For instance, the performance of the particular LIDAR sensor may be impacted by wavelength stability and/or detector (receiver) sensitivity. As an example, the wavelength of the laser source at the particular LIDAR sensor may vary with temperatures while a poor signal-to-noise ratio (SNR) can degrade the LIDAR sensor receive.

Generally, the LIDAR sensor simulation/emulation sub-module 226 can reproduce or improve on any one or more of the characteristics 230. For instance, the LIDAR sensor simulation/emulation sub-module 226 can reproduce a temporal characteristic (e.g., scan frequency) and/or a limitation (e.g., range, reflectivity, behaviors under weather conditions, blind spot, etc.) of the particular LIDAR sensor when generating the synthesized LIDAR data 208. Alternatively, the LIDAR sensor simulation/emulation sub-module 226 can improve a temporal characteristic and/or a limitation of the particular LIDAR sensor when generating the synthesized LIDAR data 208. As an example, the synthesized LIDAR data 208 may include point clouds similar to data acquired using the particular LIDAR sensor with an increased scan frequency. As another example, the synthesized LIDAR data 208 may include point clouds similar to data acquired using the particular LIDAR sensor with an increased scan range, an increased reflectivity of objects of interest, a decreased reflectivity from ghost objects (reflections) or ego-vehicle, an improved accuracy or an increased visibility or scan range under weather condition, and/or a reduced blind spot area.

Stated differently, the generation of the synthesized LIDAR data 208 may include the object detection sub-module 220 detecting objects from the image data 202, the object library 224 providing point clouds corresponding to the detected objects, and the LIDAR sensor simulation/emulation sub-module 226 generating the synthesized LIDAR data 208 by simulating and/or emulating characteristics 230 of a particular LIDAR sensor onto the point clouds provided by the object library 224. Accordingly, the synthesized LIDAR data 208 may include point cloud data representative of the detected objects and having characteristics of the particular LIDAR sensor as discussed above.

Subsequently, the synthesized LIDAR data 208 may be provided to the AV processing stack 140. One or more modules (e.g., the perception module 142, the prediction module 144, the planning module 146, the control module 148, and/or other modules) of the AV processing stack 140 may determine an action (e.g., a driving decision) for the AV 110 using the synthesized LIDAR data 208. That is, the sensor data converter 200 can receive live-captures of images and convert the images to synthesized LIDAR data on the fly to control the AV 110. In some instances, the AV processing stack 140 may determine the action further using map information and/or AV location information associated with a current location of the AV 110 as discussed above with reference to FIG. 1.

While FIG. 2 describes the conversion from the image data 202 to the synthesized LIDAR data 208 at an object level, the conversion can be performed at any suitable level, e.g., subset of pixels, bounded boxes, etc. Further, in some instances, the LIDAR sensor characteristic simulation and/or emulation performed by the LIDAR sensor simulation/emulation sub-module 226 can be optional, for example, depending on the sensitivity of the AV processing stack 140 to each characteristic. For example, if the AV processing stack 140 is not sensitive to the scan frequency, simulation of the scan frequency can be omitted, or replaced by a different scan frequency.

FIG. 3 provides an illustration of an exemplary implementation of a sensor data converter 300, according to some embodiments of the present disclosure. In some aspects, the AV 110 of FIG. 1 may implement the sensor data converter 300 in place of the sensor data converter 130 shown in FIG. 1. The sensor data converter 300 can be implemented in software executed by the one or more processors of the onboard computer 160.

As shown in FIG. 3, the sensor data converter 300 may include an ML model 310. The sensor data converter 300 may receive image data 302 (e.g., from the vision sensor(s) 152 of the AV 110 in real-time). The image data 302 may be substantially similar to the image data 202. The ML model 310 may be a neural network including a plurality of layers, each including weights and/or biases as discussed above. In some aspects, the ML model 310 may be a generator model trained using an open loop training as will be discussed more fully below with reference to FIG. 5. In other aspects, the ML model 310 may be a generator model that is trained jointly with a discriminator model in a GAN model as will be discussed more fully below with reference to FIGS. 6-7. The ML model 310's parameters (e.g., weights and/or biases) may be trained to generate LIDAR data or point clouds from vision-based sensor data. As shown, the trained ML model 310 may process the image data 302 (e.g., through each of the plurality of layers for computations using respective parameters for the layer) to generate synthesized LIDAR data 308.

Subsequently, the synthesized LIDAR data 308 may be provided to the AV processing stack 140. One or more modules (e.g., the perception module 142, the prediction module 144, the planning module 146, the control module 148, and/or other modules) of the AV processing stack 140 may determine an action (e.g., a driving decision) for the AV 110 using the synthesized LIDAR data 308. That is, the sensor data converter 300 can receive live-captures of images and convert the images to synthesized LIDAR data on the fly to control the AV 110. In some instances, the AV processing stack 140 may determine the action further using map information and/or AV location information associated with a current location of the AV 110 as discussed above with reference to FIG. 1.

While FIG. 3 illustrates the sensor data converter 300 including one ML model 310, the sensor data converter 300 can include multiple ML models similar to the ML model 310 but with different trained parameters. For example, a first ML model may be trained to generate point clouds representative of cars from images of cars, a second ML model may be trained to generate point clouds representative traffic lights from images of traffic lights, etc.

FIG. 4 provides an illustration of an exemplary implementation of a sensor data converter 400, according to some embodiments of the present disclosure. In some aspects, the AV 110 of FIG. 1 may implement the sensor data converter 400 in place of the sensor data converter 130 shown in FIG. 1. The sensor data converter 400 can be implemented in software executed by the one or more processors of the onboard computer 160. The sensor data converter 400 may be substantially similar to the sensor data converter 300. As shown, the sensor data converter 400 may include an ML model 410. The ML model 410 may have a substantially similar architecture as the ML model 310. However, the ML model 410's parameters (e.g., weights and/or biases) may be trained to enhance or improve LIDAR data or point clouds using vision-based sensor data.

For instance, AV 110 may receive image data 402 captured by the vision sensor(s) 152 in real-time. The image data 402 may be substantially similar to the image data 120, 202, and/or 302. Additionally, the AV 110 may receive LIDAR data 404 (raw LIDAR data including point clouds) captured by the LIDAR sensor(s) 154 in real-time. The LIDAR data 404 may be substantially similar to the LIDAR data 124. Both the image data 402 and the LIDAR data 404 may include information associated with a common scene in a surrounding of the AV 110. The trained ML model 410 may process the image data 402 and the raw LIDAR data 404 (e.g., through each of the plurality of layers for computations using respective parameters for the layer) to generate enhanced LIDAR data 408 on the fly. As discussed above, camera sensors may capture visual data from optics in the lens while LIDAR sensors emit light pulse and use light signals reflected from objects in the surroundings to determine distances to those objects and/or attributes of those objects. Due to the different sensing modalities used by camera sensors versus LIDAR sensors, camera sensors and LIDAR sensors can have different strengths and weaknesses. For example, the LIDAR data 404 may have a limited resolution while the image data 402 can have a high resolution, and thus the image data 402 can be used to augment the LIDAR data 404 to provide the enhanced LIDAR data 408 with a higher information density and/or accuracy than the LIDAR data 404 alone.

Subsequently, the enhanced LIDAR data 408 may be provided to the AV processing stack 140. One or more modules (e.g., the perception module 142, the prediction module 144, the planning module 146, the control module 148, and/or other modules) of the AV processing stack 140 may determine an action (e.g., a driving decision) for the AV 110 using the enhanced LIDAR data 408. In some instances, the AV processing stack 140 may determine the action further using map information and/or AV location information associated with a current location of the AV 110 as discussed above with reference to FIG. 1.

While FIG. 4 illustrate the sensor data converter 400 including one ML model 410, the sensor data converter 400 can include multiple ML models similar to the ML model 410 but with different trained parameters. For example, a first ML model may be trained to enhance point clouds representative of cars using images of corresponding cars, a second ML model may be trained to enhance point clouds representative traffic lights using images of corresponding traffic lights, etc.

In some aspects, the AV 110 may utilize any suitable combination of sensor data conversion mechanisms discussed above with reference to FIGS. 2-4. In some aspects, the AV 110 can include multiple sensor data converters, each implementing a different one of the sensor data converters 200, 300, or 400, and may utilize a different one of the sensor data converters at a different time (e.g., based on certain geographical areas and/or any suitable factors). Additionally, the AV 110 may further receive location information from a GPS and/or an IMU in the sensor suite 150 of the AV 110, where the AV location information may be associated with a current location of the AV 110 and may include data describing a geographical location (e.g., GPS coordinates) of the AV 110 and/or an orientation of the AV 110 with respect to its surroundings. The AV 110 may utilize the AV location information for sensor data conversion and/or for determining an action (e.g., steering, braking, accelerating, decelerating, etc.) to be carried out for the AV 110.

Example ML Model Training for Sensor Data Converter

Figure 5:
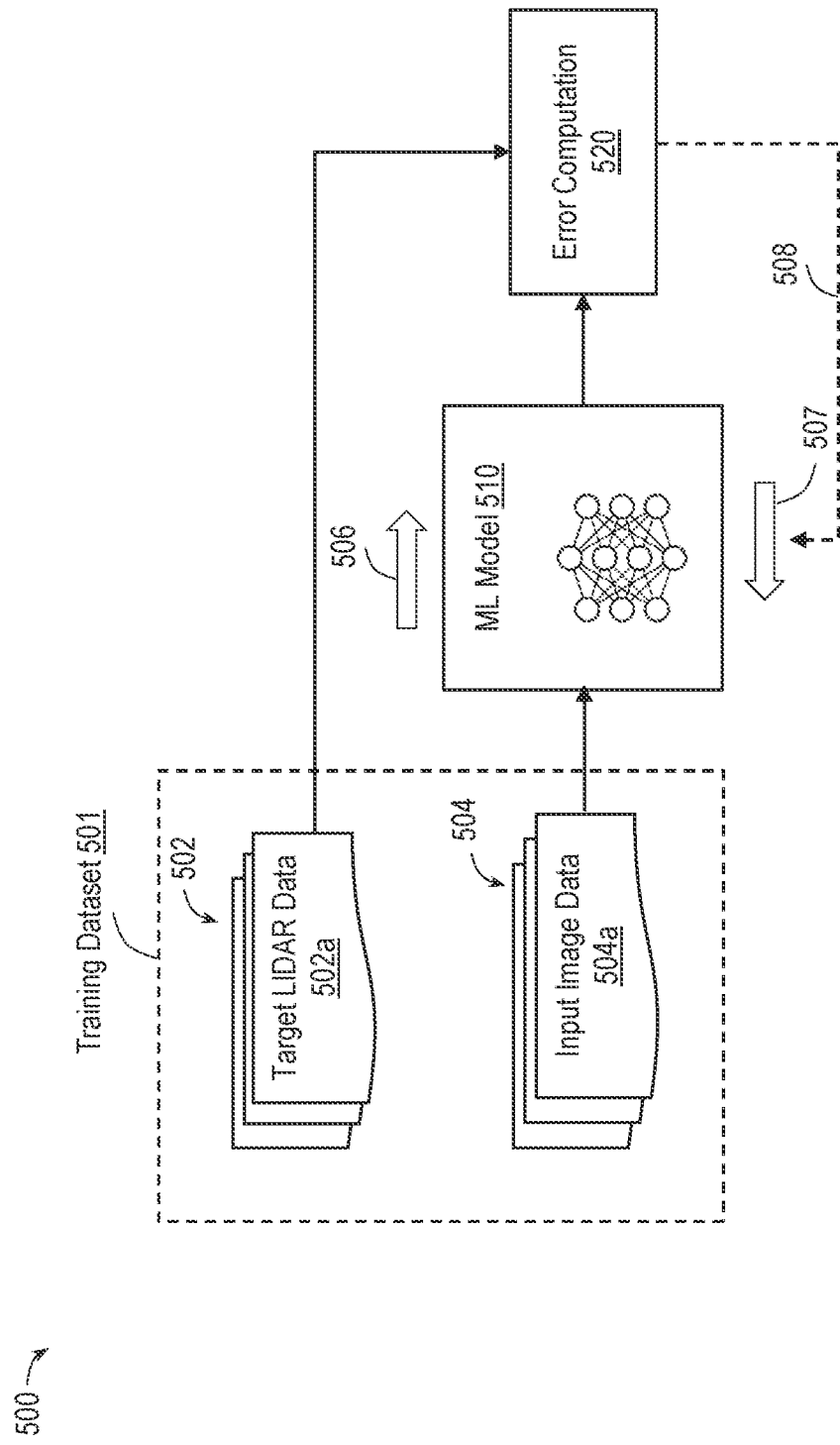
FIG. 5 provides an illustration of an exemplary scheme for training a machine learning (ML) model for sensor data conversion, according to some embodiments of the present disclosure.
Figure 6:
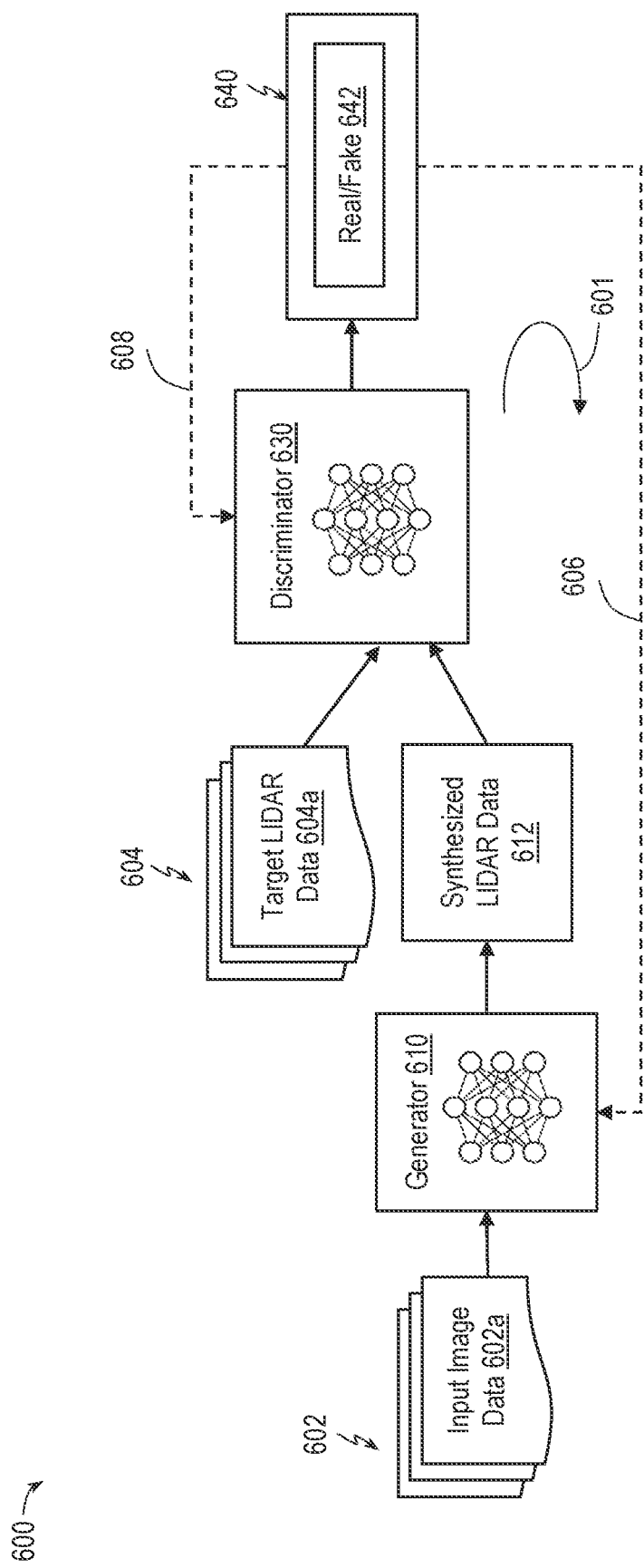
FIG. 6 provides an illustration of an exemplary generative adversarial network (GAN) for training a generator model to convert vision-based sensor data to LIDAR data, according to some embodiments of the present disclosure.
Figure 7:
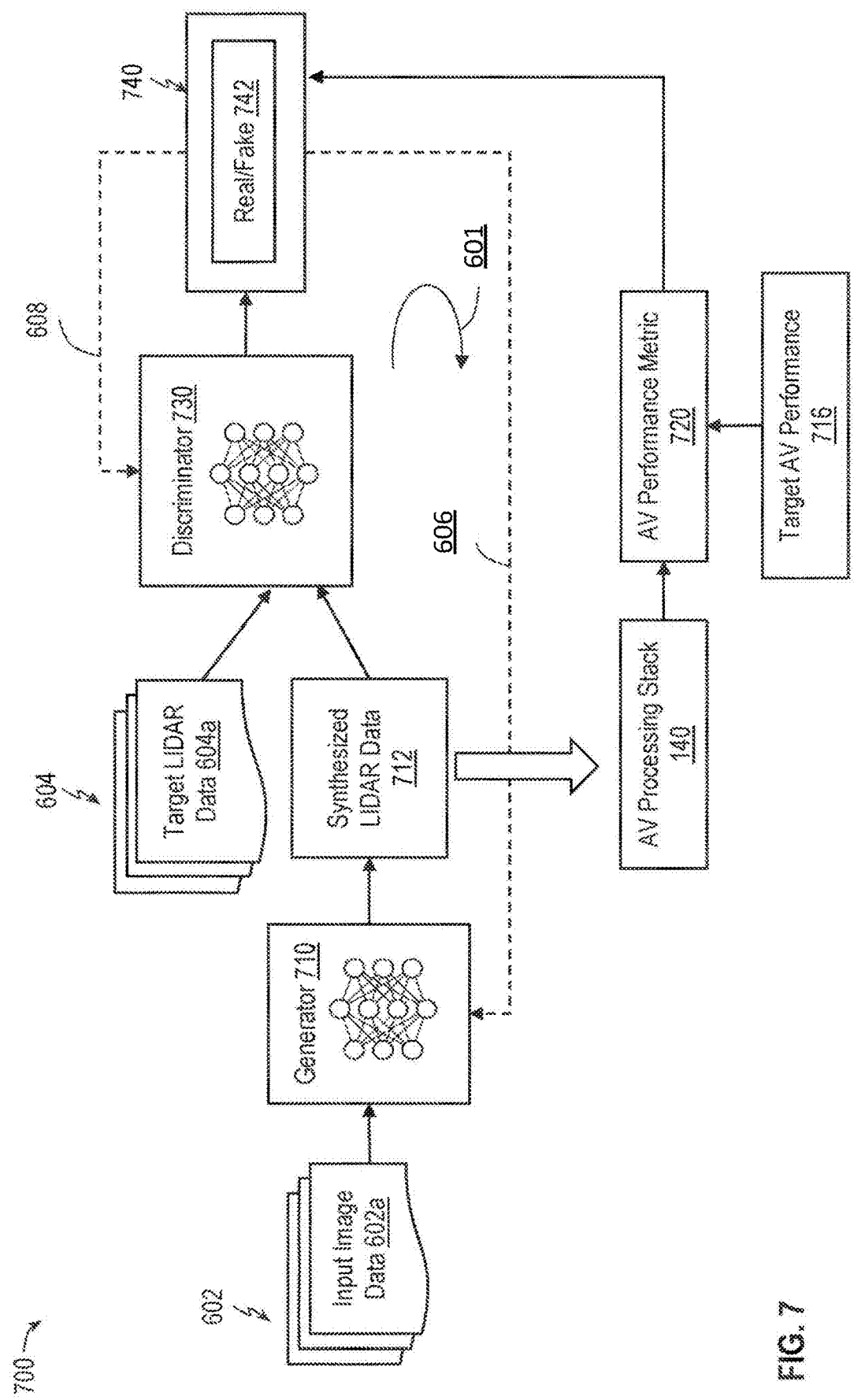
FIG. 7 provides an illustration of an exemplary GAN for training a generator model to convert vision-based sensor data to LIDAR data, according to some embodiments of the present disclosure.

FIGS. 5-7 illustrate various mechanisms for training an ML model (e.g., the ML model 310) to generate LIDAR data from image data. As will be discussed more fully below, similar mechanisms may also be used to train an ML model (e.g., the ML model 410) to enhance LIDAR data with vision data.

FIG. 5 provides an illustration of an exemplary scheme 500 for training an ML model 510 for sensor data conversion, according to some embodiments of the present disclosure. For instance, the ML model 510 may correspond to the ML model 310 of FIG. 3, and a trained ML model 510 can be deployed in the AV 110 for sensor data conversion as discussed above with reference to FIGS. 1 and/or 3. The scheme 500 may be implemented by a computer-implemented system (e.g., the system 1100 of FIG. 11).

As shown in FIG. 5, the ML model 510 may operate on a training dataset 501. The training dataset 501 may include target LIDAR data 502 and input image data 504. Each sample of input image data 504 may be associated with a sample of target LIDAR data 502. For instance, the training data set 501 may include first input image data 504a and associated first target LIDAR data 502a. The first input image data 504a and the first target LIDAR data 502a (point cloud data) may include representations for a common same scene. For example, the first input image data 504a may be captured using the vision sensor(s) 152, and the first target LIDAR data 502a may be captured using the LIDAR sensor(s) 154.

The ML model 510 may include an input layer, followed by one or more hidden layers and an output layer, and each layer may include a set of weights and/or biases that can transform inputs received from a previous layer and the resulting outputs can be passed to the next layer as discussed above. The weights and/or biases in each layer of the ML model 510 can be trained and adapted to generate synthesized LIDAR sensor data (e.g., point cloud) from image data.

To train the ML model 510, the first input image data 504a may be passed through each layer of ML model 510 in a forward direction (e.g., a forward propagation process 506). The ML model 510 may process the first input image data 504a at each layer of the ML model 510 according to respective parameters such as weights and/or biases for the layer. The error computation module 520 may compute an error based on the ML model 510's output and the first target LIDAR data 502a and determine a loss based on the error. The loss may be used to update the ML model 510 as shown by the dashed arrow 508, for example, by performing a backpropagation process 507 through the layers of the ML model 510 while adjusting the weights and/or biases at each layer of the ML model 510. The forward propagation process 506 and the backpropagation process 507 can be repeated until the error is minimized or the loss metric satisfies a certain threshold. Subsequently, the trained ML model 510 can be used to convert vision-based sensor data to LIDAR data as discussed above with reference to FIG. 3.

In an aspect, the training dataset 501 can be alternatively configured to train the ML model 510 to enhance LIDAR data with vision data. For instance, the training data set 501 may include input image data, input LIDAR data, and target enhanced LIDAR data. The input image data and the input LIDAR data may capture representations of a common scene, and the target enhanced LIDAR data may include an enhanced representation of the common scene. For instance, target enhanced LIDAR data may be more informational (e.g., higher density of information) and/or more accurate than the input LIDAR data alone. The ML model 510 may process the input image data and the input LIDAR data, and the error computation module 520 may compute an error based on the ML model 510's output and the target enhanced LIDAR data and determine a loss based on the error. The loss can be used to update the ML model 510 as discussed above. Subsequently, the trained ML model 510 can be used to generate enhanced LIDAR data from input image data and input LIDAR data as discussed above with reference to FIG. 4.

FIG. 6 provides an illustration of an exemplary GAN model 600 for training a generator model 610 for sensor data conversion, according to some embodiments of the present disclosure. For instance, the generator model 610 may correspond to the ML model 310 of FIG. 3, and the trained ML model 610 can be deployed in the AV 110 for sensor data conversion as discussed above with reference to FIGS. 1 and/or 3. The GAN model 600 may be implemented by a computer-implemented system (e.g., the system 1100 of FIG. 11).

As shown in FIG. 6, the GAN model 600 may include the generator model 610 and a discriminator model 630 operating in a closed loop 601. Each of the generator model 610 and the discriminator model 630 may be an ML model including an input layer, followed by one or more hidden layers and an output layer. Each layer may include a set of weights and/or biases that can transform inputs received from a previous layer and the resulting outputs can be passed to the next layer. For sensor data conversion, the weights and/or biases in each layer can be trained and adapted, for example, to generate or synthesize LIDAR data from input image data, in the case of the generator model 610, or to classify if synthesized LIDAR data is real or fake, in the case of the discriminator model 630.

The GAN model 600 may be trained using a training data set including input image data 602 and target LIDAR data 604 (e.g., point clouds). Each sample of input image data 602 may be associated with a sample of target LIDAR data 604. For instance, the training data set may include first input image data 602a and associated first target LIDAR data 604a. The first input image data 602a and the first target LIDAR data 604a (point cloud data) may include representations for a common same scene. For example, the first input image data 602a may be captured using the vision sensor(s) 152, and the first target LIDAR data 604a may be captured using the LIDAR sensor(s) 154.

To train the generator model 610, the first input image data 602a may be passed through each layer the generator model 610 in a forward direction. The generator model 610 may process the first input image data 602a at each layer of the generator model 610 according to respective parameters such as weights and/or biases for the layer. The generator model 610 may output synthesized LIDAR data 612. The synthesized LIDAR data 612 and the first target LIDAR data 604a may be input into the discriminator model 630. The discriminator model 630 may process the synthesized LIDAR data 612 and the first target LIDAR data 604a (e.g., the raw LIDAR data from a live capture) at each layer of the discriminator model 630 according to respective parameters such as weights and/or biases for the layer. The discriminator model 630 may output a predicted probability of whether the synthesized LIDAR data 612 input to the discriminator model 630 is a real sample or a fake sample (e.g., a generated LIDAR data sample). A loss function 640 such as a binary cross entropy loss function may be used to compute a real/fake score 642 that penalizes the discriminator model 630's output probability based on a distance from a corresponding expected or target value. The real/fake score 642 output by the loss function 640 is then used to update the discriminator model 630 as shown by the arrow 608 and the generator 610 as shown by the arrow 606. Each of the generator model 610 and discriminator model 630 may be updated using a backpropagation process to adjust the weights and/or biases at respective model layers discussed above with reference to FIG. 5.

After the updates, the loop 601 may be repeated. In general, the discriminator model 630 may be updated to be better at discriminating between a real sample and a fake sample in a next iteration of the loop 601, while the generator model 610 may be updated based on how well, or not the generated synthesized LIDAR data 612 fooled the discriminator model 630 in classifying the synthesized LIDAR data 612 as a real sample. The loop 601 can be repeated until the discriminator model 630 until synthesized LIDAR data generated by the generator model 610 is indistinguishable from the first target LIDAR data 604a. That is, the discriminator model 630 may classify the synthesized LIDAR data generated by the generator model 610 as real. After that, the training of the generator model 610 and the discriminator model 630 can be repeated for a next input image data 602 and associated target LIDAR data 604.

In some aspects, after the generator model 610 and the discriminator model 630 are trained, synthesized LIDAR data generated by the generator model 610 that are classified as real samples by the discriminator model 630 may be fed back into the training set as target LIDAR data 604 for subsequent training. In other words, the GAN model 600 can also be used to generate training data samples for training a ML model (e.g., the ML models 310, 410, 510, 610) to convert vision data to LIDAR data.

In an aspect, the generator model 610 may be alternatively trained to generate enhanced LIDAR data from input image data and input LIDAR data, and the discriminator model 630 may be alternatively trained to distinguish between target enhanced LIDAR data (e.g., a real sample) and target enhanced LIDAR data (e.g., a fake sample) so that the trained generator model 610 may be used to enhance LIDAR data with vision data as discussed above with reference to FIG. 4. The training/updating mechanisms for the generator model 610 and the discriminator model 630 may be substantially the same as for the sensor data conversion discussed above.

FIG. 7 provides an illustration of an exemplary GAN model 700 for training a generator model 710 for sensor data conversion, according to some embodiments of the present disclosure. For instance, the generator model 710 may correspond to the ML model 310 of FIG. 3, and the trained ML model 710 can be deployed in the AV 110 for sensor data conversion as discussed above with reference to FIGS. 1 and/or 3. The GAN model 700 may be implemented by a computer-implemented system (e.g., the system 1100 of FIG. 11).

The GAN model 700 may be similar to the GAN model 600 in many respects. For example, the GAN model 700 may include a generator model 710 and a discriminator model 730 having substantially the same architecture as the generator model 610 and the discriminator model 630, respectively, and may be trained in a closed loop 601 (to update the generator model 710 and the discriminator model 730) as discussed with reference to FIG. 6. Further, the GAN model 700 may be trained using first input image data 602a and corresponding target LIDAR data 604a. However, the discriminator model 730 may be trained to discriminate between real/fake based on AV performance (e.g., run-time performance and/or driving performance) by modifying a loss function 740. That is, the GAN model 700 may be trained in a way that synthesized LIDAR data 712 generated by the generator model 710 from the first input image data 602a may cause the AV 110 to have similar behaviors and/or performance (e.g., similar run-time performance and/or driving performance) as corresponding target LIDAR data 604a (e.g., point cloud).

As shown in FIG. 7, the generator model 710 may process the first input image data 602a to output synthesized LIDAR data 712. To train the discriminator model 730 to discriminate real/fake based on based on AV performance, the synthesized LIDAR data 712 may be processed by the AV processing stack 140. For example, the computer-implemented system may run a simulator (e.g., as part of the training code) implementing the same operations as the AV processing stack 140 at the AV 110 and may determine a perception, a prediction, a plan, and/or a control using the synthesized LIDAR data 712. An AV performance metric 720 can be calculated based on the determined perception, prediction, plan, and/or control in comparison to a target AV performance 716. In some examples, the AV performance metric 720 can be based on a response time of an AV in responding to a certain situation. In some examples, the AV performance metric 720 can be based on one or more driving scenarios (e.g., 1, 2, 3, 4, 5, 6, 10, 30, 40, 50 or more) and can be an average driving score for the driving scenarios. The AV performance metric 720 may be used to modify the loss function 740 such that the real/fake score 742 may incorporate AV performance to penalize the discriminator 730's output probability. In some instances, the AV performance metric 720 may be based on latency and/or memory consumption of individual components (142, 144, 146, 148). In other instances, the AV performance metric 720 may be based on latency and/or memory consumption of the end-to-end AV processing stack 140. For example, images that lead to a very high latency, reaction time and/or memory may be penalized by including an appropriate term in the loss function 740. Subsequently, the real/fake score 742 may be used to update the generator model 710 and the discriminator model 730.

Example Sensor Data Conversion and Associated ML Model Training Processes

Figure 8:
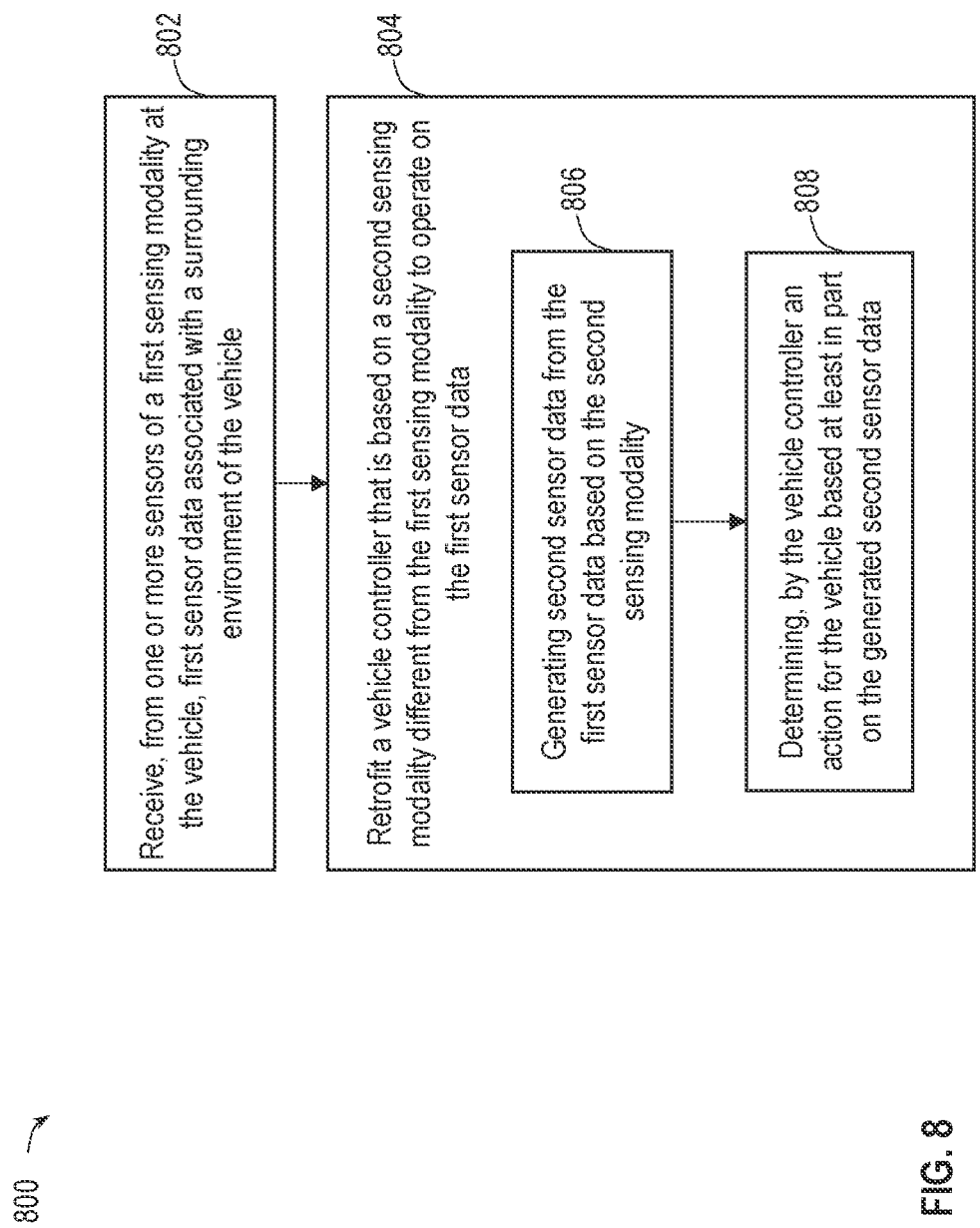
FIG. 8 is a flow diagram illustrating a process for retrofitting a LIDAR-based vehicle computing system to operate with vision-based sensor data, according to some embodiments of the present disclosure.

FIG. 8 is a flow diagram illustrating an exemplary process 800 for retrofitting a LIDAR-based vehicle computing system to operate with vision-based sensor data, according to some embodiments of the present disclosure. The process 800 can be implemented by a computed-implemented system (e.g., the onboard computer 160 of FIG. 1 or the computer system 1100 of FIG. 11) at a vehicle (e.g., the AV 110). In general, the process 800 may be performed using any suitable hardware components and/or software components. The process 800 may utilize similar mechanisms as discussed above with reference to FIGS. 1-7. Operations are illustrated once each and in a particular order in FIG. 8, but the operations may be performed in parallel, reordered, and/or repeated as desired.

In some aspects, the computer-implement system may include memory storing instruction and one or more computer processors, where the instructions, when executed by the one or more computer processors, cause the one or more computer processors to perform the operations of the process 800. In other aspects, the operations of the process 800 may be in the form of instructions encoded in a non-transitory computable-readable storage medium that, when executed by one or more computer processors of the computer-implemented system, cause the one or more computer processors to perform the process 800.

At 802, first sensor data associated with a surrounding environment of the vehicle may be received from one or more sensors of a first sensing modality at the vehicle.

At 804, a vehicle controller of the vehicle that is based on a second sensing modality different the first sensing modality may be retrofitted to operate on the first sensor data. For example, the vehicle controller may be designed, developed, trained, optimized, and/or tested to determine controls for the vehicle using mainly sensor data of the second sensing modality. The retrofitting may include performing operations at 804 and 806. For instance, at 806, second sensor data may be generated from the first sensor data based on a second sensing modality different from the first sensing modality, for example, using a sensor data converter as discusses herein. At 808, an action for the vehicle may be determined by the vehicle controller based at least in part on the generated second sensor data.

In some aspects, the one or more sensors of the first sensing modality are vision-based sensors, and the second sensing modality is LIDAR. Accordingly, the first sensor data received at 802 may include an image (e.g., the image data 120, 202, 302, 402) of a scene in the surrounding environment of the vehicle, and the generating the second sensor data at 8046 may include generating, based on the image, a point cloud representative of at least a portion of the scene. In some instances, the generation of the point cloud from the image may be because of a lack of availability of LIDAR data or a lack of LIDAR sensors at the vehicle. For example, the vehicle may be built with camera sensors and a reduced number of LIDAR sensor or without LIDAR sensors to reduce cost while reusing the vehicle controller (e.g., AV processing stack 140) configured to operate on LIDAR data.

In some aspects, the generating the second sensor data at 806 may include determining, from the image, at least one object in the portion of the scene, and generating a first point cloud representative of the at least one determined object. In some aspects, the vehicle controller for determining the action for the vehicle 808 may be configured based on a particular LIDAR sensor. For instance, the vehicle controller may implement at least one of perception, prediction, planning, and/or control algorithms designed, developed, trained, optimized, and/or tested using LIDAR data captured by the particular LIDAR sensor (or LIDAR sensor device model). Accordingly, the generating the point cloud representative of the at least the portion of the scene in the image may be further based on a characteristic of the particular LIDAR sensor.

In some aspects, the generating the second sensor data at 804 may include generating the point cloud representative of the at least the portion of the scene (captured by the image) in the image further based on a temporal characteristic (e.g., a scan frequency) of the particular LIDAR sensor. In some aspects, the generating the point cloud representative of the at least the portion of the scene may be further based on an improved temporal characteristic of the particular LIDAR sensor, the improved temporal characteristic including at least a scan frequency higher than a scan frequency of the particular LIDAR sensor. In some aspects, the generating the point cloud representative of the at least the portion of the scene may be further based on a limitation of the particular LIDAR sensor. The limitation may be associated with at least one of a scan range of the particular LIDAR sensor, a reflectivity of the particular LIDAR sensor, or a behavior of the particular LIDAR sensor under a weather condition. In some aspects, the generating the point cloud representative of the at least the portion of the scene may be further based on an improved limitation of the particular LIDAR sensor. For instance, the improved limitation may include at least one of a scan range longer than a scan range of the particular LIDAR sensor, a reflectivity higher than a reflectivity of the particular LIDAR sensor, or a visibility range under a weather condition longer than a visibility range of the particular LIDAR sensor under the weather condition. In some aspects, the generating the point cloud representative of the at least the portion of the scene may be further based on a heuristic algorithm that emulates the characteristic of the particular LIDAR sensor, for example, as discussed above with reference to FIG. 2.

In some aspects, the generating the second sensor data at 804 may include processing the first sensor data using an ML model to generate the second sensor data, for example, as discussed above with reference to FIG. 3. In some aspects, the ML model is a generator model trained jointly with a discriminator model in a GAN model, for example, as discussed above with reference to FIGS. 6-7.

In some aspects, the process 800 may further include receiving third sensor data from the one or more sensors of the first sensing modality at the vehicle and receiving fourth sensor data from one or more sensors of the second sensing modality at the vehicle. The process 800 may further include generating enhanced sensor data of the second modality based on the third sensor data of the first sensing modality and the fourth sensor data of the second sensing modality. The process 800 may further include determining, by the vehicle controller, another action for the vehicle based on the enhanced fourth sensor data. For instance, the third sensor data may be image data (e.g., the image data 120, 202, 302, 402), the fourth sensor data may be real-time captured raw LIDAR data (e.g., the LIDAR data 124 or 404), and the enhanced sensor data may be enhanced LIDAR data as discussed above with reference to FIGS. 1 and 4.

Figure 9:
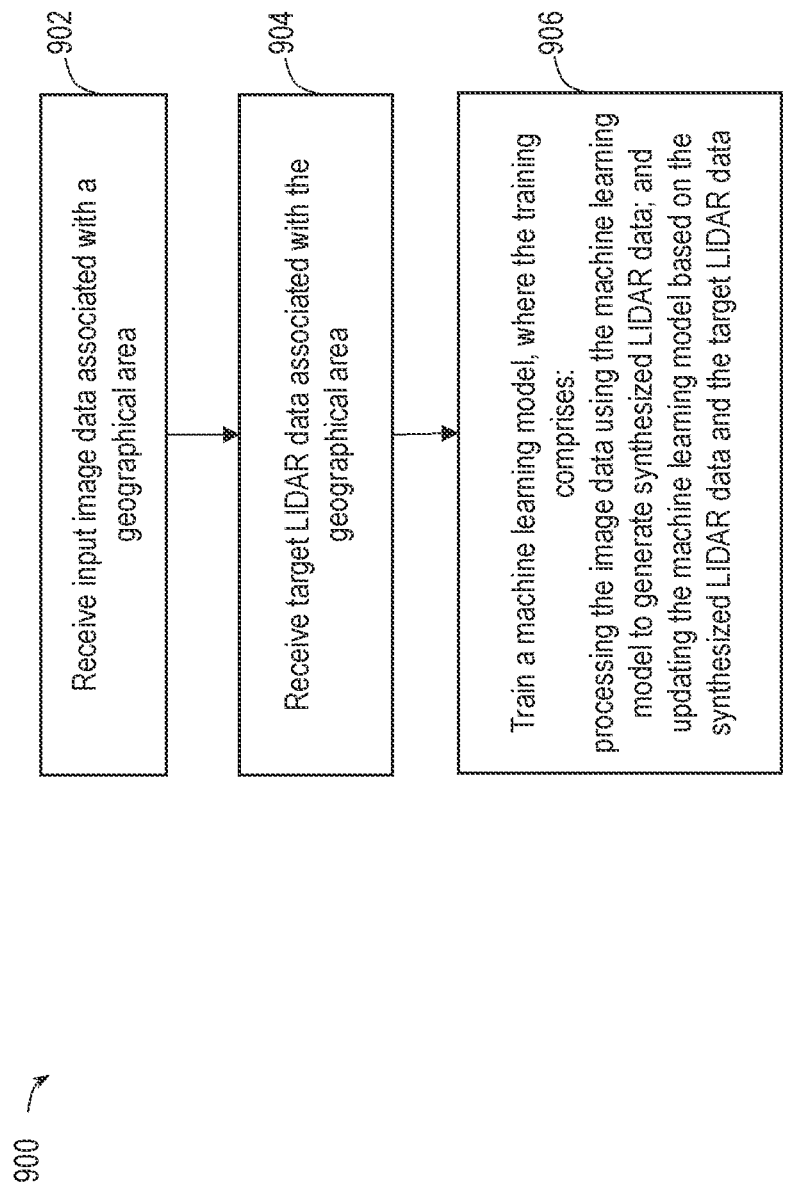
FIG. 9 is a flow diagram illustrating a process for training an ML model for vision-based sensor data to LIDAR-based sensor data conversion, according to some embodiments of the present disclosure.

FIG. 9 is a flow diagram illustrating an exemplary process 900 for training an ML model for vision-based sensor data to LIDAR-based sensor data conversion, according to some embodiments of the present disclosure. The process 900 can be implemented by a computed-implemented system (e.g., the computer system 1100 of FIG. 11). The process 900 may utilize similar mechanisms as discussed above with reference to FIGS. 5-7. Operations are illustrated once each and in a particular order in FIG. 9, but the operations may be performed in parallel, reordered, and/or repeated as desired.

In some aspects, the computer-implement system may include memory storing instruction and one or more computer processors, where the instructions, when executed by the one or more computer processors, cause the one or more computer processors to perform the operations of the process 900. In other aspects, the operations of the process 900 may be in the form of instructions encoded in a non-transitory computable-readable storage medium that, when executed by one or more computer processors of the computer-implemented system, cause the one or more computer processors to perform the process 900.

At 902, input image data associated with a geographical area may be received.

At 904, target LIDAR data associated with the geographical area may be received. In some instances, the input image data may correspond to the input image data 504, and the target LIDAR data may correspond to the target LIDAR data 502. In some instances, the input image data may correspond to the input image data 602, and the target LIDAR data may correspond to the target LIDAR data 604.

At 906, an ML model (e.g., the ML models 310, 410, 510, 610, 630, 600, 710, 730, and/or 700) may be trained. The training may include processing the input image data using the ML model to generate synthesized LIDAR data and updating the ML model based on the synthesized LIDAR data and the target LIDAR data. In some aspects, the ML model may be a GAN model including a generator model and a discriminator model, for example, as discussed above with reference to FIGS. 6-7. Accordingly, the training may include processing the input image data using the generator model to generate the synthesized LIDAR data. The training may further include processing the synthesized LIDAR data and the target LIDAR data using the discriminator model. The training may further include updating at least one of the generator model or the discriminator model based on an output of the discriminator model. In some aspects, the updating the ML model may be further based on one or more criteria associated with a driving performance. For instance, the training the ML model may further include performing at least one of perception, prediction, or planning operations associated with driving using a first driving performance and updating the ML model further based on a comparison of the first driving performance to a target driving performance.

Example AV

Figure 10:
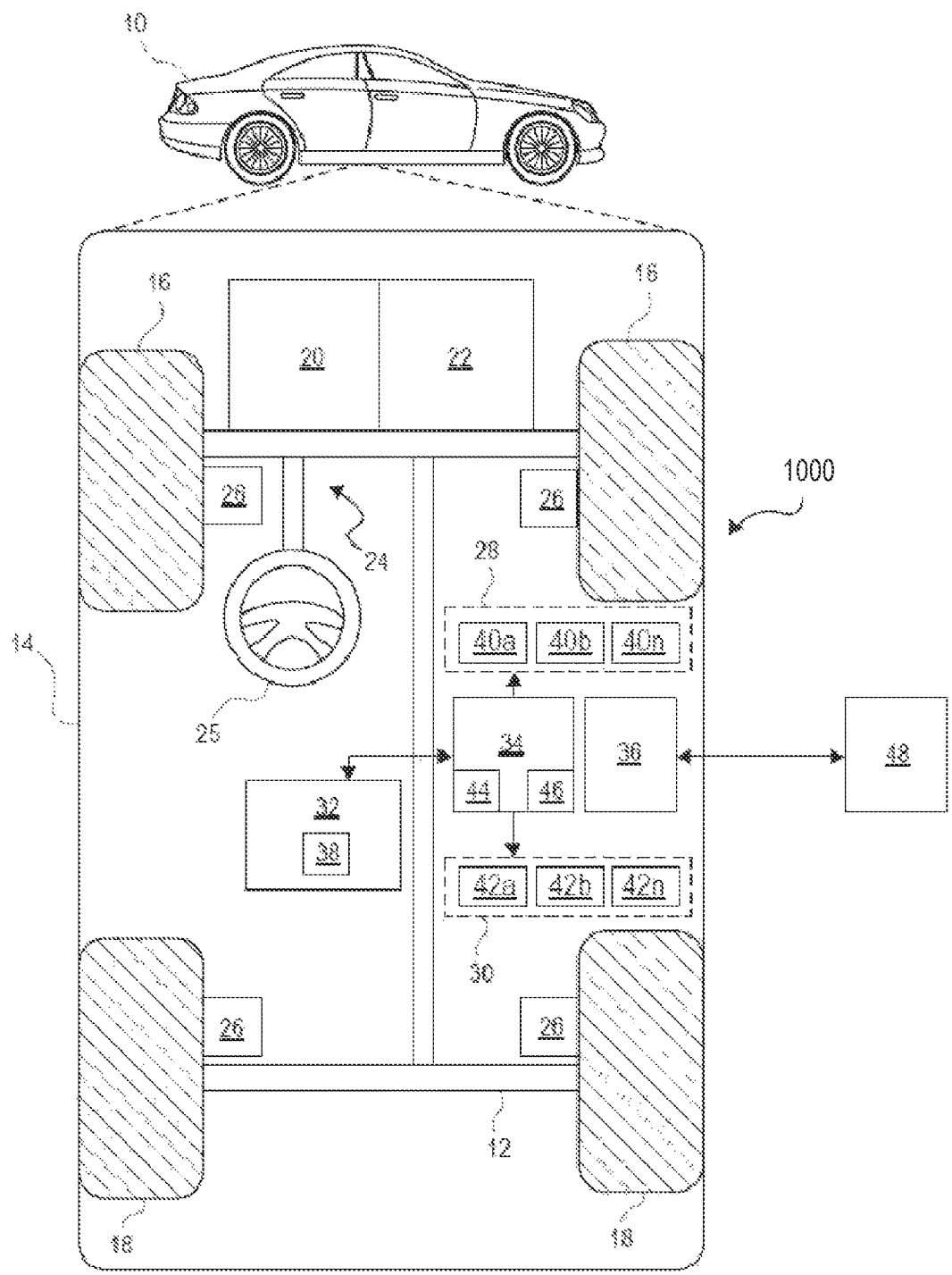
FIG. 10 illustrates an exemplary AV, according to some embodiments of the present disclosure.

FIG. 10 illustrates an exemplary AV 10, according to some embodiments of the present disclosure. In some aspects, the AV 10 may correspond to the AV 110 of FIG. 1.

As depicted in FIG. 10, the AV 10 may generally include a chassis 12, a body 14, front wheels 16, and rear wheels 18. The body 14 may be arranged on the chassis 12 and encloses components of the AV 10. The body 14 and the chassis 12 may jointly form a frame. The front wheels 16 and rear wheels 18 may be rotationally coupled to the chassis 12 near a respective corner of the body 14. In some examples, the chassis 12 nay differ from the chassis on which the sensor arrays are mounted. For example, the sensor arrays can be mounted on the roof of the AV 10.

In various embodiments, the AV 10 may be an autonomous vehicle and the system 1000 and/or components thereof may be incorporated into the AV 10. The AV 10 may be, for example, a vehicle that may be automatically controlled to carry passengers and/or cargo from one location to another. While the AV 10 may be depicted as a passenger car in FIG. 1, any other vehicle, including motorcycles, trucks, sport utility vehicles (SUVs), recreational vehicles (RVs), marine vessels, aircraft, and the like, can also be used as an AV.

In an example, the AV 10 may correspond to a level four or level five automation system under the Society of Automotive Engineers (SAE) "J3016" standard taxonomy of automated driving levels. Using this terminology, a level four system may indicate "high automation," referring to a driving mode in which the automated driving system performs aspects of the dynamic driving task, even if a human driver does not respond appropriately to a request to intervene. A level five system may indicate "full automation," referring to a driving mode in which the automated driving system performs aspects of the dynamic driving task under roadway and environmental conditions that can be managed by a human driver. Implementations in accordance with the present subject matter are not limited to any taxonomy or rubric of automation categories. Furthermore, systems in accordance with the present disclosure can be used in conjunction with any autonomous or other vehicle that utilizes a navigation system and/or other systems to provide route guidance.

As shown, the AV 10 may generally include a propulsion system 20, a transmission system 22, a steering system 24, a brake system 26, a sensor system 28, an actuator system 30, data storage device 32, controller 34, and a communication system 36. The propulsion system 20 can, in various embodiments, include an internal combustion engine, an electric machine such as a traction motor, and/or a fuel cell propulsion system. The transmission system 22 may be configured to transmit power from the propulsion system 20 to the front wheels 16 and rear wheels 18 according to selectable speed ratios. According to various implementations, the transmission system 22 can include a step-ratio automatic transmission, a continuously-variable transmission, or other appropriate transmission.

The brake system 26 may be configured to provide braking torque to the front wheels 16 and rear wheels 18. Brake system 26 can, in various embodiments, include friction brakes, brake by wire, a regenerative braking system such as an electric machine, and/or other appropriate braking systems.

The steering system 24 may influence a position of the front wheels 16 and/or rear wheels 18. While depicted as including a steering wheel 25 for illustrative purposes, in some embodiments contemplated within the scope of the present disclosure, the steering system 24 may not include a steering wheel.

The sensor system 28 may include one or more sensing devices 40a-40n that sense observable conditions of the exterior environment and/or the interior environment of the AV 10. The sensing devices 40a-40n can include RADAR sensors, LIDAR sensors, GPSs, optical cameras, thermal cameras, time-of-flight (TOF) cameras, ultrasonic sensors, speedometers, compasses, and/or other sensors.

The actuator system 30 may include one or more actuator devices 42a-42n that control one or more vehicle features such as the propulsion system 20, the transmission system 22, the steering system 24, and the brake system 26. In various embodiments, the AV 10 can also include interior and/or exterior vehicle features not illustrated in FIG. 10, such as various doors, a trunk, and cabin features such as air conditioning, music players, lighting, touch-screen display components (such as those used in connection with navigation systems), and the like.

The data storage device 32 may store data for use in automatically controlling the AV 10. In various implementations, the data storage device 32 may store defined maps of the navigable environment. In various implementations, the defined maps may be predefined by and obtained from a remote system. For example, the defined maps may be assembled by the remote system and communicated to the AV 10 (wirelessly and/or in a wired manner) and stored in the data storage device 32. Route information can also be stored within the data storage device 32—i.e., a set of road segments (associated geographically with one or more of the defined maps) that together define a route that the user might take to travel from a start location (e.g., the user's current location) to a target location. Also, in various implementations, the data storage device 32 may store ML models 38 that are trained to facilitate autonomous driving. In some aspects, the ML models 38 may correspond to the ML models 310 and/or 410 discussed above with reference to FIGS. 3 and/or 4, respectively.

In general, the data storage device 32 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any data storage devices or memory elements discussed herein should be construed as being encompassed within the broad term "memory." As will be appreciated, the data storage device 32 can be part of the controller 34, separate from the controller 34, or part of the controller 34 and part of a separate system.

The controller 34 may include a processor 44 and a computer-readable storage device or media 46. The processor 44 can be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing computer instructions. The computer-readable storage device or media 46 can include volatile and non-volatile storage in ROM, RAM, and keep-alive memory (KAM), for example. KAM may be a persistent or non-volatile memory that can store various operating variables while the processor 44 is powered down. The computer-readable storage device or media 46 can be implemented using any of a number of memory devices such as PROMs (programmable read-only memory), EPROMs (electrically PROM), EEPROMs (electrically erasable PROM), flash memory, or any other electric, magnetic, optical, resistive, or combination memory devices capable of storing data, some of which represent executable instructions, used by the controller 34 in controlling the AV 10. As will be appreciated, while the computer-readable storage device or media 46 is depicted in FIG. 10 as part of the controller 34, the computer-readable storage device or media 46 can be part of the data storage device 32.

The instructions can include one or more separate programs that comprise an ordered listing of executable instructions for implementing logical functions. The instructions, when executed by the processor 44, can receive and process signals from the sensor system 28, perform logic, calculations, methods and/or algorithms for automatically controlling the components of the AV 10, and generate control signals transmitted to the actuator system 30 to control the components of the AV 10 based on the logic, calculations, methods, and/or algorithms. Although one controller 34 is shown in FIG. 10, embodiments of the AV 10 can include any number of controllers 34 that communicate over any suitable communication medium or a combination of communication mediums and that cooperate to process the sensor signals, perform logic, calculations, methods, and/or algorithms, and generate control signals to control features of the AV 10.

The communication system 36 may wirelessly communicates information to and from other entities 48, such as other vehicles ("V2V" communication), infrastructure ("V2I" communication), remote transportation systems, and/or user devices. In an example, the communication system 36 may be a wireless communication system configured to communicate via a wireless local area network (WLAN) using Institute of Electrical and Electronics Engineers (IEEE) 802.11 standards or by using cellular data communication (e.g., fifth-generation (5G) under the third Generation Partnership Project (3GPP)). Additional or alternate communication methods, such as a dedicated short-range communications (DSRC) channel, may also considered within the scope of the present disclosure. DSRC channels may refer to one-way or two-way short-range to medium-range wireless communication channels specifically designed for automotive use and a corresponding set of protocols and standards.

Example Computed-Implemented System

FIG. 11 illustrates components of a computing system 1100 used in implementations described herein. In some embodiments, the components of FIG. 11 can be present in a vehicle or an AV (e.g., the AV 10 of FIG. 10 and/or the AV 110 of FIG. 1). In other embodiments, the components of FIG. 11 can be present in an infrastructure system for AV.

Referring to FIG. 11, system 1100 can be implemented within one computing device or distributed across multiple computing devices or subsystems that cooperate in executing program instructions. In some implementations, the system 1100 can include one or more blade server devices, standalone server devices, personal computers, routers, hubs, switches, bridges, firewall devices, intrusion detection devices, mainframe computers, network-attached storage devices, smartphones and other mobile telephones, and other computing devices. The system hardware can be configured according to any suitable computer architectures such as a Symmetric Multi-Processing (SMP) architecture or a Non-Uniform Memory Access (NUMA) architecture.

The system 1100 can include one or more processing units 1120, which can include one or more hardware processors and/or other circuitry that retrieves and executes instructions 1112 (e.g., software or firmware codes) from memory 1110. The one or more processing units 1120 can be implemented within one processing device, chip, or package and can also be distributed across multiple processing devices, chips, packages, or subsystems that cooperate in executing program instructions. In one implementation, the one or more processing units 1120 may include a CPU and a GPU. The GPU can execute the visual/image processing in the computing system. The GPU, or any second-order processing element independent from CPU dedicated to processing imagery and other perception data in real or near real-time, can provide a significant benefit.

The memory 1110 can include any computer-readable storage media readable by one or more processing unit(s) 1120 and that stores instructions 1112. The memory 1110 can be implemented as one storage device and can also be implemented across multiple co-located or distributed storage devices or subsystems. The memory 1110 can include additional elements, such as a controller, that communicate with the one or more processing units 1120. The memory 1110 can also include storage devices and/or subsystems on which data and/or instructions may be stored. System 1100 can access one or more storage resources to access information to carry out any of the processes indicated by instructions 1112.

The instructions 1112, including routines for at least partially performing at least one of the processes illustrated in FIGS. 1-10, can be implemented in program instructions. Further, the instructions 1112, when executed by system 1100 in general or the one or more processing unit(s) 1120 in particular, can direct, among other functions, the system 1100 or the one or more processing units 1120 to operate as described herein.

In some embodiments, the system 1100 may further include a sensor data converter 1114 and a vehicle controller 1116, for example, when the system 1100 is part of an AV such as the AV 110 of FIG. 1 and/or the AV 10 of FIG. 10. Each of the sensor data converter 1114 and the vehicle controller 1116 can include hardware and/or software components. In some examples, the sensor data converter 1114 and the vehicle controller 1116 can be implemented as part of the one or more processing unit(s) 1120. The sensor data converter 1114 may convert sensor data from one sensing modality (e.g., vision-based) to another sensing modality (e.g., LIDAR-based) as discussed herein, and the vehicle controller 1116 may be retrofitted to perform AV processing including perception, prediction, planning, and/or control as discussed herein.

In implementations where the system 1100 may include multiple computing devices, the server can use one or more communications networks that facilitate communication among the computing devices. For example, the one or more communications networks can include or be a local or wide area network that facilitates communication among the computing devices. One or more direct communication links can be included between the computing devices. In addition, the computing devices can be installed at geographically distributed locations or at one geographic location, such as a server farm or an office.

System 1100 can include a communications interface 1130 that provides one or more communication connections and/or one or more devices that allow for communication between system 1100 and other computing systems (not shown) over a communication network or collection of networks (not shown) or the air.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECTED EXAMPLES

Example 1 includes a method implemented by a vehicle, the method including receiving, from one or more sensors of a first sensing modality at the vehicle, first sensor data associated with a surrounding environment of the vehicle; and retrofitting a vehicle controller that is based on a second sensing modality different from the first sensing modality to operate on the first sensor data, wherein the retrofitting includes generating second sensor data from the first sensor data based on the second sensing modality; and determining, by the vehicle controller, an action for the vehicle based at least in part on the generated second sensor data.

In Example 2, the method of Example 1 can optionally include where the one or more sensors of the first sensing modality are vision-based sensors, and the second sensing modality is light detection and ranging (LIDAR).

In Example 3, the method of any of Examples 1-2 can optionally include where the first sensor data includes an image of a scene in the surrounding environment of the vehicle; and the generating the second sensor data includes generating, based on the image, a point cloud representative of at least a portion of the scene.

In Example 4, the method of any of Examples 1-3 can optionally include where the generating the second sensor data includes determining, from the image, at least one object in the portion of the scene; and generating a first point cloud representative of the at least one determined object.

In Example 5, the method of any of Examples 1-4 can optionally include where the vehicle controller is based on a particular LIDAR sensor; and the generating the point cloud representative of the at least the portion of the scene in the image is further based on a characteristic of the particular LIDAR sensor.

In Example 6, the method of any of Examples 1-5 can optionally include where the generating the point cloud representative of the at least the portion of the scene is further based on a temporal characteristic of the particular LIDAR sensor.

In Example 7, the method of any of Examples 1-6 can optionally include where the generating the point cloud representative of the at least the portion of the scene in the image is further based on an improved temporal characteristic of the particular LIDAR sensor, the improved temporal characteristic including at least a scan frequency higher than a scan frequency of the particular LIDAR sensor.

In Example 8, the method of any of Examples 1-7 can optionally include where the generating the point cloud representative of the at least the portion of the scene in the image is further based on a limitation of the particular LIDAR sensor, the limitation associated with at least one of a scan range of the particular LIDAR sensor, a reflectivity of the particular LIDAR sensor, or a behavior of the particular LIDAR sensor under a weather condition.

In Example 9, of any of Examples 1-8 can optionally include where the generating the point cloud representative of the at least the portion of the scene in the image is further based on an improved limitation of the particular LIDAR sensor, the improved limitation including at least one of a scan range longer than a scan range of the particular LIDAR sensor; a reflectivity higher than a reflectivity of the particular LIDAR sensor; or a visibility range under a weather condition longer than a visibility range of the particular LIDAR sensor under the weather condition.

In Example 10, the method of any of Examples 1-9 can optionally include where the generating the point cloud representative of the at least the portion of the scene in the image is further based on a heuristic algorithm that emulates the characteristic of the particular LIDAR sensor.

In Example 11, the method of any of Examples 1-10 can optionally include where the generating the second sensor data includes processing the first sensor data using a machine learning model to generate the second sensor data.

In Example 12, the method of any of Examples 1-11 can optionally include where the machine learning model is a generator model trained jointly with a discriminator model in a generative adversarial network (GAN) model.

In Example 13, the method of any of Examples 1-12 can optionally include receiving, from the one or more sensors of the first sensing modality at the vehicle, third sensor data; receiving, from one or more sensors of the second sensing modality at the vehicle, fourth sensor data; generating fifth sensor data of the second sensing modality based on the third sensor data of the first sensing modality and the fourth sensor data of the second sensing modality; and determining, by the vehicle controller, another action for the vehicle based on the generated fifth sensor data.

Example 14 includes a vehicle including one or more vision sensors to capture image data; a sensor data converter to generate light detection and ranging (LIDAR) data based on the image data; and a vehicle controller to determine an action for the vehicle based at least in part on the generated LIDAR data, where the vehicle controller operates based on LIDAR sensing.

In Example 15, the vehicle of Example 14 can optionally include where the sensor data converter generates the LIDAR data by generating a point cloud representative of at least one object captured by the image data.

In Example 16, the vehicle of any of Examples 14-15 can optionally include where the sensor data converter generates the point cloud representative of the at least one object captured by the image data further based on at least one of a temporal characteristic or a limitation of a particular LIDAR sensor.

In Example 17, the vehicle of any of Examples 14-16 can optionally include where the sensor data converter generates the LIDAR data by processing the image data using a machine learning model to generate the LIDAR data.

In Example 18, the vehicle of any of Examples 14-17 can optionally include where the machine learning model is a generator model trained jointly with a discriminator model in a generative adversarial network (GAN) model.

Example 19 includes one or more non-transitory, computer-readable media encoded with instructions that, when executed by one or more processing units, perform a method including receiving input image data associated with a geographical area; receiving target light detection and ranging (LIDAR) data associated with the geographical area; and training a machine learning model, where the training includes processing the input image data using the machine learning model to generate synthesized LIDAR data; and updating the machine learning model based on the synthesized LIDAR data and the target LIDAR data.

In Example 20, the one or more non-transitory, computer-readable media of Example 19 can optionally include where the machine learning model is a generative adversarial network (GAN) model including a generator model and a discriminator model, where the training the machine learning model includes processing the input image data using the generator model to generate the synthesized LIDAR data; processing the synthesized LIDAR data and the target LIDAR data using the discriminator model; and updating at least one of the generator model or the discriminator model based on an output of the discriminator model.

In Example 21, the one or more non-transitory, computer-readable media of any of Examples 19-20 can optionally include where the updating the machine learning model is further based on one or more criteria associated with a driving performance.

In Example 22, the one or more non-transitory, computer-readable media of any of Examples 19-21 can optionally include where the training the machine learning model further includes performing at least one of perception, prediction, or planning operations associated with driving using a first driving performance; and updating the machine learning model further based on a comparison of the first driving performance to a target driving performance.

VARIATIONS AND IMPLEMENTATIONS

As will be appreciated by one skilled in the art, aspects of the present disclosure, in particular, aspects of using the generator model to add elements to and/or modify elements in a scene and using the discriminator model to classify an object from a scene, described herein, can be embodied in various manners (e.g., as a method, a system, a computer program product, or a computer-readable storage medium). Accordingly, aspects of the present disclosure can take the form of a hardware implementation, a software implementation (including firmware, resident software, or microcode) or an implementation combining software and hardware aspects that can generally be referred to herein as a "circuit," "module," "component" or "system." Functions described in this disclosure can be implemented as an algorithm executed by one or more hardware processing units, e.g. one or more microprocessors of one or more computers. In various embodiments, different steps and portions of the operations of the methods described herein can be performed by different processing units. Furthermore, aspects of the present disclosure can take the form of a computer program product embodied in one or more computer-readable media having computer-readable program code embodied, e.g., stored or encoded, thereon. In various embodiments, such a computer program can, for example, be downloaded (or updated) to the existing devices and systems or be stored upon manufacturing of these devices and systems.

The foregoing disclosure presents various descriptions of certain specific embodiments. The innovations described herein can be embodied in a multitude of different ways, for example, as defined and covered by the claims and/or select examples. In the following description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some embodiments can incorporate any suitable combination of features from two or more drawings.

The foregoing disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. Numerous implementation-specific decisions might be made to achieve the developer's specific goals, including compliance with system, business, and/or legal constraints, which may vary from one implementation to another. Additionally, while such a development effort might be complex and time-consuming; it would be a routine undertaking for those of ordinary skill in the art having the benefit of this disclosure.

In the Specification, reference might be made to spatial relationships between various components and to the spatial orientation of various aspects of components as depicted in the attached drawings. As will be recognized by those skilled in the art after a complete reading of the present disclosure, the devices, components, members, and apparatuses described herein can be positioned in any orientation. Thus, the use of terms such as "above", "below", "upper", "lower", "top", "bottom", or other similar terms to describe a spatial relationship between various components or to describe the spatial orientation of aspects of such components, describe a relative relationship between the components or a spatial orientation of aspects of such components, respectively, as the components described herein can be oriented in any direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

In addition, the terms "storage media," "computer-readable storage media," or "computer-readable storage medium" can refer to non-transitory storage media, such as a hard drive, a memory chip, and cache memory, and to transitory storage media, such as carrier waves or propagating signals.

Further, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

In one example embodiment, any number of electrical circuits of the FIGS. can be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.) and computer-readable, non-transitory memory elements can be coupled to the board based on particular configurations, processing demands, or computer designs. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have been offered for purposes of example and teaching. Such information can be varied considerably, as the specifications apply to non-limiting examples. In the foregoing description, example implementations have been described with reference to particular arrangements of components. Various modifications and changes can be made to such implementations. The description and drawings are, accordingly, to be regarded in an illustrative sense and not in a restrictive sense.

With the numerous examples provided herein, interaction may be described in terms of two, three, four, or more electrical components for purposes of clarity and example. The system can be consolidated in any suitable manner. Along similar design alternatives, any of the illustrated components, modules, and elements of the FIGS. can be combined in various possible configurations within the scope of this disclosure. In certain cases, it might be easier to describe one or more of the functionalities of a given set of flows by referencing a limited number of electrical elements. The electrical circuits of the FIGS. and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

Note that in this Specification, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might not necessarily be combined in the same embodiments.

Note that the functions related to using the generator model to add elements to and/or modify elements in a scene and using the discriminator model to classify an object from a scene, e.g. those summarized in the one or more processes shown in FIGS., illustrate some of the possible functions that can be executed by, or within, the systems illustrated in the FIGS. Some of these operations can be deleted or omitted where appropriate, or these operations can be modified or changed considerably. In addition, the timing of these operations can be altered considerably. The preceding operational flows have been offered for purposes of example and discussion. Implementations described herein provide flexibility, in that any suitable arrangements, chronologies, configurations, and timing mechanisms can be provided.

Numerous other changes, substitutions, variations, alterations, and modifications might be ascertained by one skilled in the art, and the present disclosure encompasses such changes, substitutions, variations, alterations, and modifications as falling within the scope of the appended claims. Optional features of the apparatus described above can be implemented with respect to the method or process described herein and specifics in the examples can be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method, the method comprising:
receiving, from one or more sensors of a first sensing modality disposed on a vehicle, first sensor data including an image of a scene in associated with a surrounding environment of the vehicle, wherein the one or more sensors of the first sensing modality are vision-based sensors; and retrofitting a vehicle controller of the vehicle that is based on a second sensing modality different from the first sensing modality to operate on the first sensor data, wherein the second sensing modality is light detection and ranging (LIDAR), wherein the vehicle controller is based on a particular LIDAR sensor, wherein the retrofitting comprises:

generating second sensor data from the first sensor data based on the second sensing modality, wherein the generating of the second sensor data comprises generating, based on the image, a point cloud representative of at least a portion of the scene, wherein the generating of the point cloud representative of the at least the portion of the scene in the image is based on:
a characteristic of the particular LIDAR sensor, and
a limitation of the particular LIDAR sensor;
determining, by the vehicle controller, an action for the vehicle based at least in part on the generated second sensor data; and implementing, by the vehicle, the action determined based on the generated second sensor data, wherein at least one of the one or more sensors of the first sensing modality have been retrofit into the vehicle to replace a sensor of the second sensing modality previously disposed on the vehicle.

2. The method of claim 1, wherein the generating of the second sensor data comprises:
determining, from the image, at least one object in the portion of the scene; and
generating a first point cloud representative of the at least one determined object.

3. The method of claim 1, wherein the limitation of the particular LIDAR sensor is associated with at least one of a scan range of the particular LIDAR sensor, a reflectivity of the particular LIDAR sensor, or a behavior of the particular LIDAR sensor under a weather condition.

4. The method of claim 1, wherein the generating of the point cloud representative of the at least the portion of the scene in the image is further based on a heuristic algorithm that emulates the characteristic of the particular LIDAR sensor.

5. The method of claim 1, wherein the generating of the second sensor data comprises:
processing the first sensor data using a machine learning model to generate the second sensor data.

6. The method of claim 5, wherein the machine learning model is a generator model trained jointly with a discriminator model in a generative adversarial network (GAN) model.

7. The method of claim 1, further comprising:
receiving, from the one or more sensors of the first sensing modality at the vehicle, third sensor data;
receiving, from one or more sensors of the second sensing modality at the vehicle, fourth sensor data;
generating fifth sensor data of the second sensing modality based on the third sensor data of the first sensing modality and the fourth sensor data of the second sensing modality; and
determining, by the vehicle controller, another action for the vehicle based on the generated fifth sensor data.

8. A vehicle comprising:
one or more vision sensors to capture image data;
a sensor data converter to generate light detection and ranging (LIDAR) data based on the image data, wherein the sensor data converter generates the LIDAR data by:
generating a point cloud representative of at least one object captured by the image data, wherein the generating of the point cloud representative of the at least the portion of the scene in the image is based on:
a characteristic of a particular LIDAR sensor, and
a limitation of the particular LIDAR sensor;
a vehicle controller to determine an action for the vehicle based at least in part on the generated LIDAR data, wherein the vehicle controller operates based on LIDAR sensing; and
wherein the vehicle controller is further configured to implementing the action determined based on the generated LIDAR data,
wherein at least one of the one or more vision sensors have been retrofit into the vehicle to replace a LIDAR sensor previously disposed on the vehicle.

9. The vehicle of claim 8, wherein the sensor data converter generates the LIDAR data by:
generating a point cloud representative of at least one object captured by the image data.

10. The vehicle of claim 8, wherein the sensor data converter generates the LIDAR data by processing the image data using a machine learning model to generate the LIDAR data.

11. The vehicle of claim 10, wherein the machine learning model is a generator model trained jointly with a discriminator model in a generative adversarial network (GAN) model.

* * * * *